US012803717B2

(12) United States Patent
Kittichokechai et al.

(10) Patent No.: US 12,803,717 B2
(45) Date of Patent: Nov. 17, 2026

(54) PUCCH CARRIER SWITCHING

(71) Applicant: Telefonaktiebolaget LM Ericsson (publ), Stockholm (SE)

(72) Inventors: Kittipong Kittichokechai, Järfälla (SE); Ali Behravan, Stockholm (SE); Alexey Shapin, Luleå (SE); Yufei Blankenship, Kildeer, IL (US); Sorour Falahati, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 667 days.

(21) Appl. No.: 18/030,649

(22) PCT Filed: Oct. 20, 2021

(86) PCT No.: PCT/SE2021/051044
§ 371 (c)(1),
(2) Date: Apr. 6, 2023

(87) PCT Pub. No.: WO2022/086414
PCT Pub. Date: Apr. 28, 2022

(65) Prior Publication Data

US 2023/0379095 A1 Nov. 23, 2023

Related U.S. Application Data

(60) Provisional application No. 63/094,107, filed on Oct. 20, 2020.

(51) Int. Cl.

| | |
|---|---|
| ***H04L 1/1829*** | (2023.01) |
| ***H04L 5/00*** | (2006.01) |
| ***H04W 72/21*** | (2023.01) |

(52) U.S. Cl.
CPC .......... *H04L 1/1854* (2013.01); *H04L 5/0035* (2013.01); *H04L 5/0055* (2013.01); *H04W 72/21* (2023.01)

(58) Field of Classification Search
CPC ... H04L 1/1854; H04L 5/0035; H04L 5/0055; H04L 1/1861; H04L 1/1864; H04L 5/001;
(Continued)

(56) References Cited

U.S. PATENT DOCUMENTS

| | | | | |
|---|---|---|---|---|
| 9,461,780 | B2 * | 10/2016 | Liang | H04L 1/1812 |
| 11,611,412 | B2 | 3/2023 | Takeda et al. | |

(Continued)

FOREIGN PATENT DOCUMENTS

| | | | |
|---|---|---|---|
| CN | 103843423 | A | 6/2014 |
| CN | 106416363 | A | 2/2017 |

(Continued)

OTHER PUBLICATIONS

Extended European Search Report for European Patent Application No. 25166136.9 dated Jun. 25, 2025, 15 pages.

(Continued)

*Primary Examiner* — Ayaz R Sheikh
*Assistant Examiner* — Louis Samara
(74) *Attorney, Agent, or Firm* — Sage Patent Group

(57) ABSTRACT

There is provided a method for operating a network node. The method of operating a network node includes configuring a UE with a PUCCH group including a plurality of cells, and configuring the UE to dynamically change a cell on which HARQ-ACK feedback for a cell of the PUCCH group is transmitted. A network node, a method for a user equipment and a user equipment is also provided.

18 Claims, 22 Drawing Sheets

(58) Field of Classification Search
CPC .... H04L 5/0098; H04L 5/0044; H04W 72/21; H04W 72/23; H04W 28/20
See application file for complete search history.

(56) References Cited

U.S. PATENT DOCUMENTS

| | | | | |
|---|---|---|---|---|
| 12,301,506 | B2 * | 5/2025 | Park | H04L 5/0044 |
| 2016/0270062 | A1 * | 9/2016 | Dinan | H04W 72/21 |
| 2016/0323873 | A1 | 11/2016 | Takeda et al. | |
| 2017/0041923 | A1 | 2/2017 | Park | |
| 2018/0295608 | A1 * | 10/2018 | Nguyen | H04W 72/23 |
| 2018/0368043 | A1 | 12/2018 | Ramachandra et al. | |
| 2019/0053103 | A1 * | 2/2019 | Manolakos | H04W 28/20 |
| 2020/0120641 | A1 * | 4/2020 | Yang | H04J 11/003 |
| 2021/0036750 | A1 * | 2/2021 | Chen | H04B 7/0482 |
| 2021/0243779 | A1 | 8/2021 | Takeda et al. | |
| 2022/0038218 | A1 | 2/2022 | Kim et al. | |
| 2022/0046677 | A1 | 2/2022 | Talarico et al. | |
| 2022/0094479 | A1 | 3/2022 | Gao et al. | |
| 2022/0095337 | A1 | 3/2022 | Wang et al. | |
| 2022/0159640 | A1 * | 5/2022 | Matsumura | H04B 7/0404 |
| 2022/0182899 | A1 * | 6/2022 | Li | H04W 36/0072 |
| 2022/0183038 | A1 | 6/2022 | Saber et al. | |
| 2022/0278809 | A1 | 9/2022 | Papasakellariou | |
| 2023/0246765 | A1 | 8/2023 | Rico Alvarino et al. | |
| 2024/0146468 | A1 | 5/2024 | Wang et al. | |
| 2024/0188083 | A1 | 6/2024 | Kittichokechai et al. | |
| 2024/0236980 | A1 * | 7/2024 | Choi | H04L 1/1854 |

FOREIGN PATENT DOCUMENTS

| | | | | |
|---|---|---|---|---|
| IN | 202047018167 | A | 6/2020 | |
| JP | 2015-126394 | A | 7/2015 | |
| JP | 2022-545688 | A | 10/2022 | |
| WO | WO-2015110035 | A1 * | 7/2015 | H04W 72/23 |
| WO | WO-2021032203 | A1 * | 2/2021 | H04W 72/21 |
| WO | WO-2021101314 | A1 * | 5/2021 | H04L 5/0053 |
| WO | WO-2022035238 | A1 * | 2/2022 | H04W 72/20 |

OTHER PUBLICATIONS

Notice of Reasons for Rejection, including English translation, for Japanese Patent Application No. 2023-524137 mailed Apr. 23, 2024, 11 pages.
International Search Report and Written Opinion of the International Searching Authority, PCT/SE2021/051044, mailed Apr. 28, 2022, 18 pages.
Moderator (Nokia), Feature lead summary #1 on Rel-17 HARQ-ACK feedback enhancements for NR Rel-17 URLLC/IIoT (AI 8.3.1.1); 3GPP TSG-RAN WG1 Meeting #102-e, R1-2007059, eMeeting, Aug. 17-28, 2020, 28 pages.
Huawei et al, "UE feedback enhancement for HARQ-ACK," 3GPP TSG RAN WG1 Meeting #102-e, R1-2005243, E-meeting, Aug. 17-28, 2020, 8 pages.
Mediatek Inc., "On UE feedback enhancement for HARQ-ACK", 3GPP TSG RAN WG1 Meeting #104-e, R1-2100574, e-Meeting, Jan. 25-Feb. 5, 2021, 19 pages.
NEC, "UE feedback enhancement for HARQ-ACK", 3GPP TSG RAN WG1 #104-e, R1-2100948, e-Meeting, Jan. 25-Feb. 5, 2021, 14 pages.
Nokia (Moderator), "Moderator summary #2 on HARQ-ACK feedback enhancements for NR Rel-17 URLLC/IIoT", 3GPP TSG-RAN WG1 Meeting #104-e, R1-2101818, e-Meeting, Jan. 25-Feb. 5, 2021, 175 pages.
Qualcomm Incorporated, "HARQ-ACK enhancement for IOT and URLLC", 3GPP TSG RAN WG1 #104-e, R1-2101459, e-Meeting, Jan. 25-Feb. 5, 2021, 17 pages.
Communication pursuant to Article 94(3) EPC for European Patent Application No. 21801666.5 mailed Jan. 31, 2024, 8 pages.

* cited by examiner

PUCCH CARRIER SWITCHING

CROSS REFERENCE TO RELATED APPLICATIONS

This application is a 35 U.S.C. § 371 national stage application of PCT International Application No. PCT/SE2021/051044 filed on Oct. 20, 2021, which in turn claims domestic priority to U.S. Provisional Patent Application No. 63/094,107, filed on Oct. 20, 2020, the disclosures and content of which are incorporated by reference herein in their entirety.

FIELD

The present disclosure relates generally to communications, and more particularly, to wireless communications and related wireless devices and network nodes.

BACKGROUND

A way to obtain wider bandwidth is by use of Carrier Aggregation (CA). CA was introduced in LTE release 10 and is also a feature available in NR. CA implies that a UE may receive multiple component carriers (CCs). The CC are aggregated into a wider "carrier" thereby increasing the bandwidth. The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different in uplink and downlink.

A UE that is configured for carrier aggregation connects to one Primary Serving Cell (known as the 'PCell' in MCG, Master Cell Group, or 'PSCell' in SCG, Secondary Cell Group) and one or more Secondary Serving Cell (known as 'SCell').

All RRC connections and Broadcast signalings are handled by the Primary serving cell. The primary Serving cell is the master of the whole procedure. Primary serving cell decides that which serving cell need to be aggregated or added and deleted from the Aggregation.

The role of the Primary Cell is among others to dynamically add or remove the secondary component carriers, dynamically activate and deactivate the secondary cell, handle all RRC (Radio resource control) and NAS (non-access stratum) procedures and receive measurement reports and control mobility of UE. In NR a UE can aggregate maximum up to 16 component carriers where 1 is primary component carrier (PCell) and 15 are secondary component carriers (SCells). The actual numbers of secondary serving cell that can be allocated to a UE is dependents on the UE capability.

Hybrid Automatic Repeat ReQuest (HARQ) is employed for error detection and correction. In a standard Automatic Repeat ReQuest (ARQ) method, error detection bits are added to data to be transmitted. In HARQ, error correction bits are also added. When the receiver receives a data transmission, the receiver uses the error detection bits to determine if data has been lost. If data has been lost and the receiver is not able to use error correction bits to recover the data, then the receiver may use a second transmission of additional data to recover the data lost. The conventional HARQ feedback scheme employs a single ACK/NACK bit for a transport block (bit value=1 is the transport block is successfully decoded and bit value=0 if decoding the transport block fails) but more advanced HARQ feedback schemes are also available.

For carrier aggregation, HARQ-ACK feedback messages are transmitted by default on the PCell or PUCCH-SCell of the corresponding PUCCH group. If one wishes to use another UL cell for HARQ-ACK transmission, it is allowed only for a newly added SCell to semi-statically configure a serving cell ID within the same PUCCH group to use for the HARQ-ACK transmission.

The existing behavior of HARQ-ACK feedback messages may be too restrictive in some scenarios, especially when the delay of HARQ-ACK transmission is of very high importance. For example, the PCell or PUCCH-SCell, or the configured UL cell for HARQ-ACK feedback, may not have a TDD pattern that is suitable for fast HARQ-ACK feedback, which may result in a delay bottleneck for the overall DL transmission.

SUMMARY

In some embodiments there is provided a method for operating a network node. The method of operating a network node includes configuring a UE with a PUCCH group including a plurality of cells, and configuring the UE to dynamically change a cell on which HARQ feedback for a cell of the PUCCH group is transmitted.

In some embodiments the method of operating a network node includes configuring the UE with two PUCCH groups, wherein each PUCCH group comprises a plurality of cells, where the HARQ feedback relating to DL transmissions on the cells in the first PUCCH group is transmitted in the UL of the PCell of the first PUCCH group and the HARQ feedback relating to DL transmissions on the cells in the second PUCCH group is transmitted in the UL of the PSCell or on a PUCCH-SCell of the second PUCCH group. The method further includes configuring the UE to switch the PUCCH carrier, within at least one of the PUCCH groups, on which HARQ the feedback is transmitted.

In some embodiments there is provided a network node. The network node includes a processor circuit, a transceiver coupled to the processor circuit, and a memory coupled to the processor circuit. The memory comprising machine readable program instructions that, when executed by the processor circuit, cause the network node to perform operations including configuring a UE with a PUCCH group including a plurality of cells, where the HARQ feedback relating to DL transmissions on the cells in the PUCCH group is transmitted in the UL of a cell within the PUCCH group. The method further includes configuring the UE to switch the PUCCH carrier, within the PUCCH group, of the PUCCH group on which HARQ feedback is transmitted.

In some embodiments there is provide a method of operating a user equipment The method of operating a user equipment includes configuring (1202) a physical uplink control channel, PUCCH, group including a plurality of cells, wherein HARQ feedback relating to downlink, DL, transmissions on the cells in the PUCCH group is transmitted in the uplink, UL of a cell within the PUCCH group and to receive a configuration to switch the PUCCH carrier, within the PUCCH group, on which HARQ feedback is transmitted.

In some embodiments the method for operating a UE includes configuring two PUCCH groups, wherein each PUCCH group comprises a plurality of cells, wherein the HARQ feedback relating to DL transmissions on the cells in the first PUCCH group is transmitted in the UL of the primary cell, PCell, of the first PUCCH group and the HARQ feedback relating to DL transmissions on the cells in the second PUCCH group is transmitted in the UL of the primary second cell, PSCell, or on a PUCCH secondary cell, PUCCH-SCell, of the second PUCCH group; and receive a configuration (1208) to switch the PUCCH carrier, within at least one of the PUCCH groups, on which HARQ the feedback is transmitted.

In some embodiments there is provided a user equipment. The user equipment includes a processor circuit, a transceiver coupled to the processor circuit and a memory coupled to the processor circuit. The memory comprising machine readable program instructions that, when executed by the processor circuit, cause the network node to perform operations including configuring a physical uplink control channel, PUCCH, group including a plurality of cells, where HARQ feedback relating to downlink transmissions on the cells in the PUCCH group is transmitted in the uplink, UL of a cell within the PUCCH group and configuring to switch the PUCCH carrier, within the PUCCH group, on which HARQ feedback is transmitted.

The proposed solutions allow for more flexible configuration of UL carrier used for HARQ-ACK feedback transmission. The embodiments allow to switch PUCCH carrier in a PUCCH group on which HARQ feedback is transmitted. The embodiments allow for example, the HARQ feedback to be provided on UL carrier in a PUCCH group and not necessarily only on the default PUCCH carriers such as PCell or PUCCH-SCell of the corresponding PUCCH group. This can be useful, e.g., for URLLC, to reduce the overall DL transmission latency which involves HARQ-ACK retransmission because the UE can switch to a PUCCH carrier which provides lower latency.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

12C is a flow chart that illustrates operations of a UE according to some embodiments.

Figure 13A:
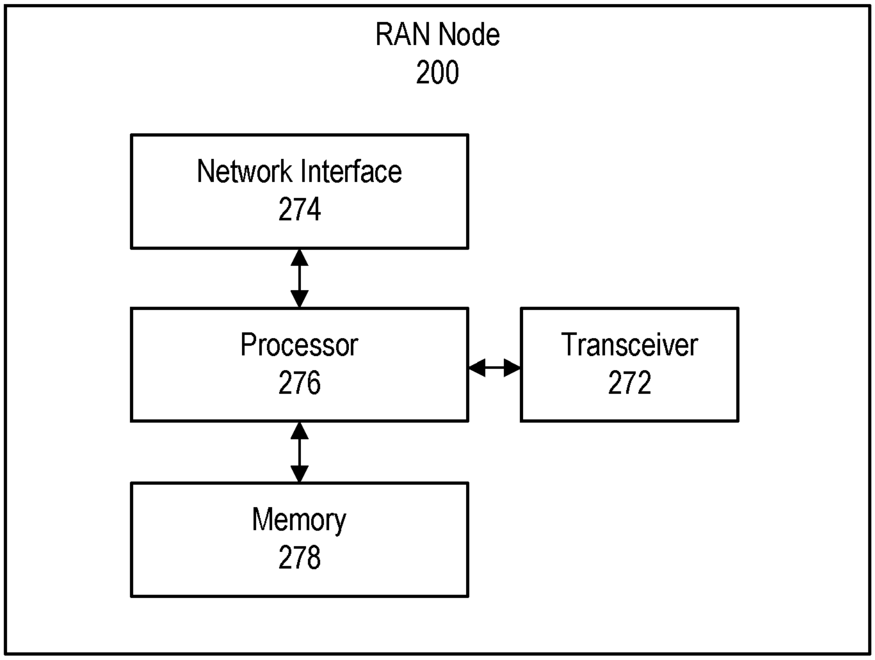
Figure 13B:
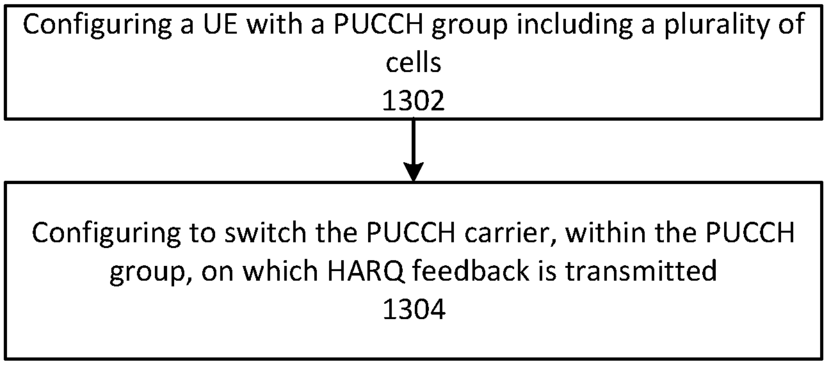

FIG. 13A is a block diagram illustrating an example of a radio access network (RAN) node according to some embodiments;

FIG. 13B is a flow chart that illustrates operations of a RAN node according to some embodiments.

Figure 13C:
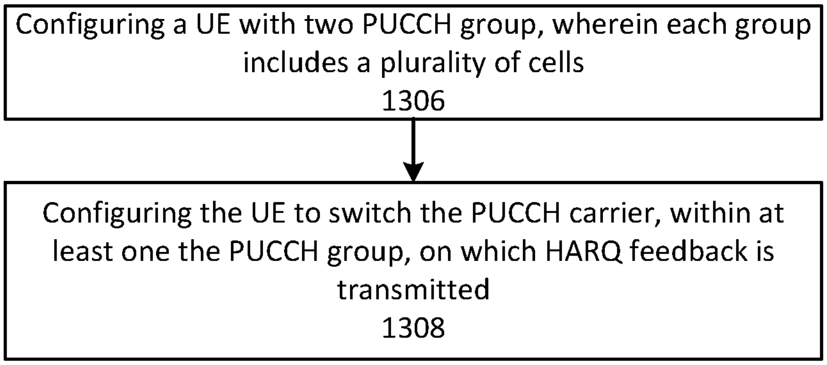

FIG. 13C is a flow chart that illustrates operations of a RAN node according to some embodiments.

Figure 14:
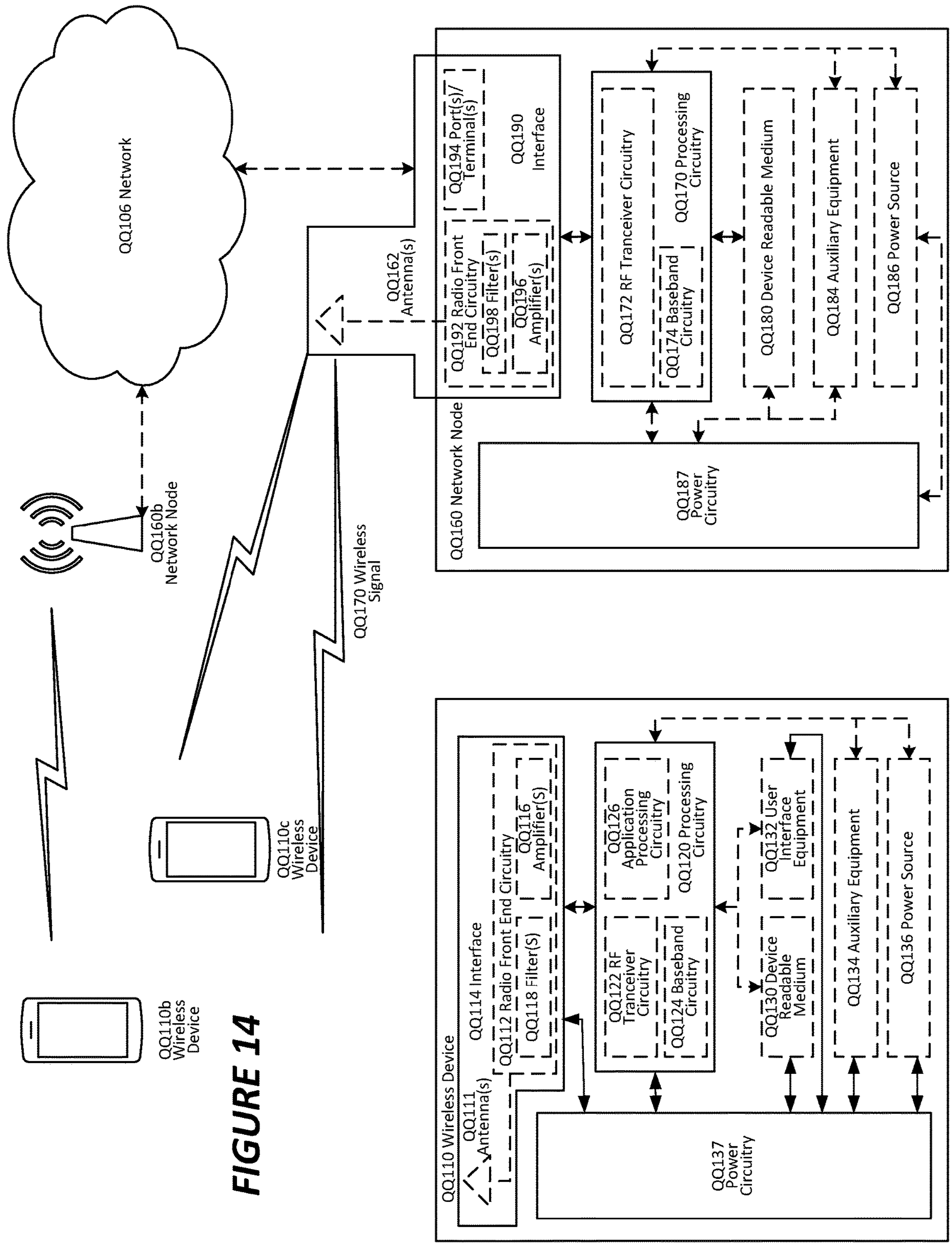
Figure 15:
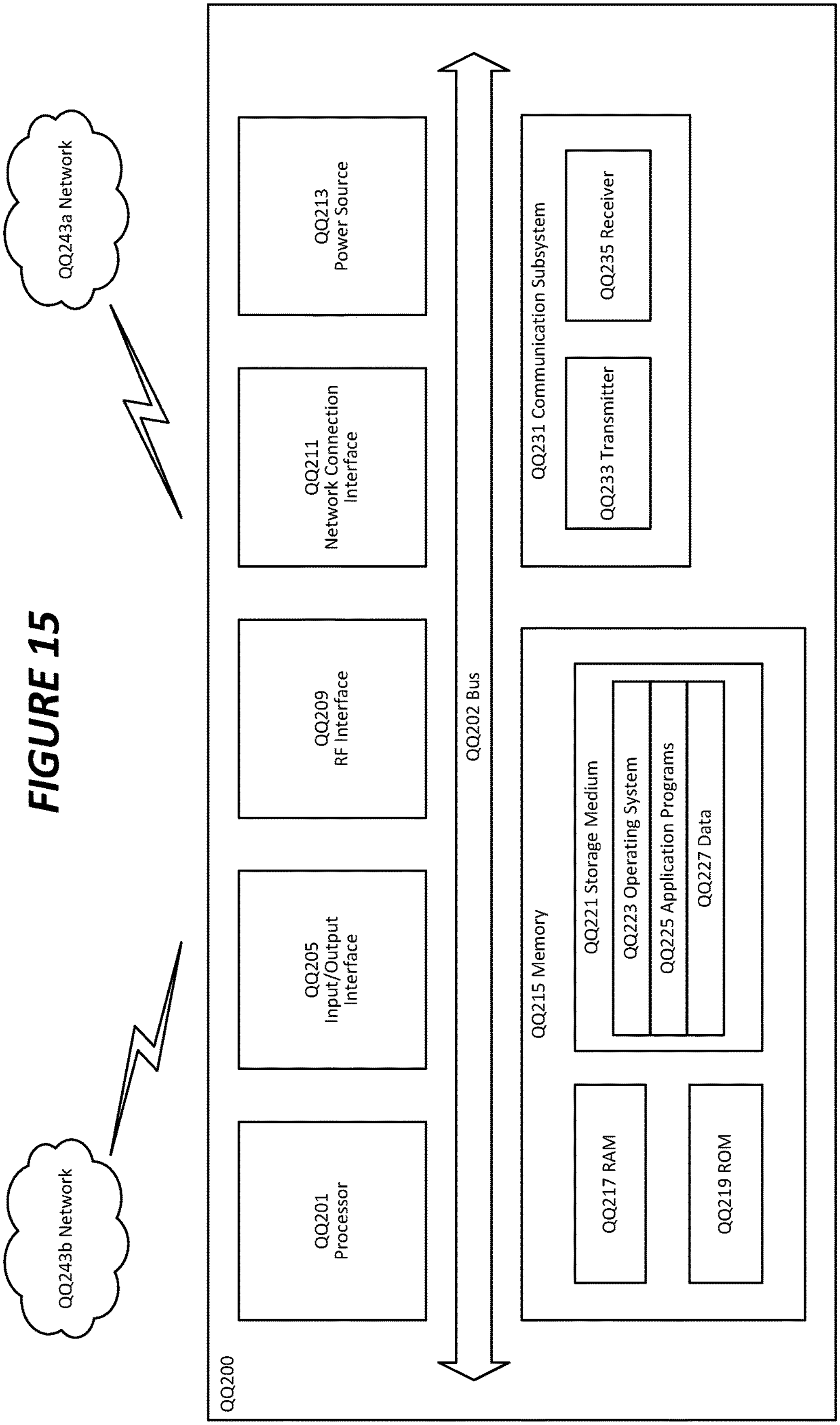
Figure 16:
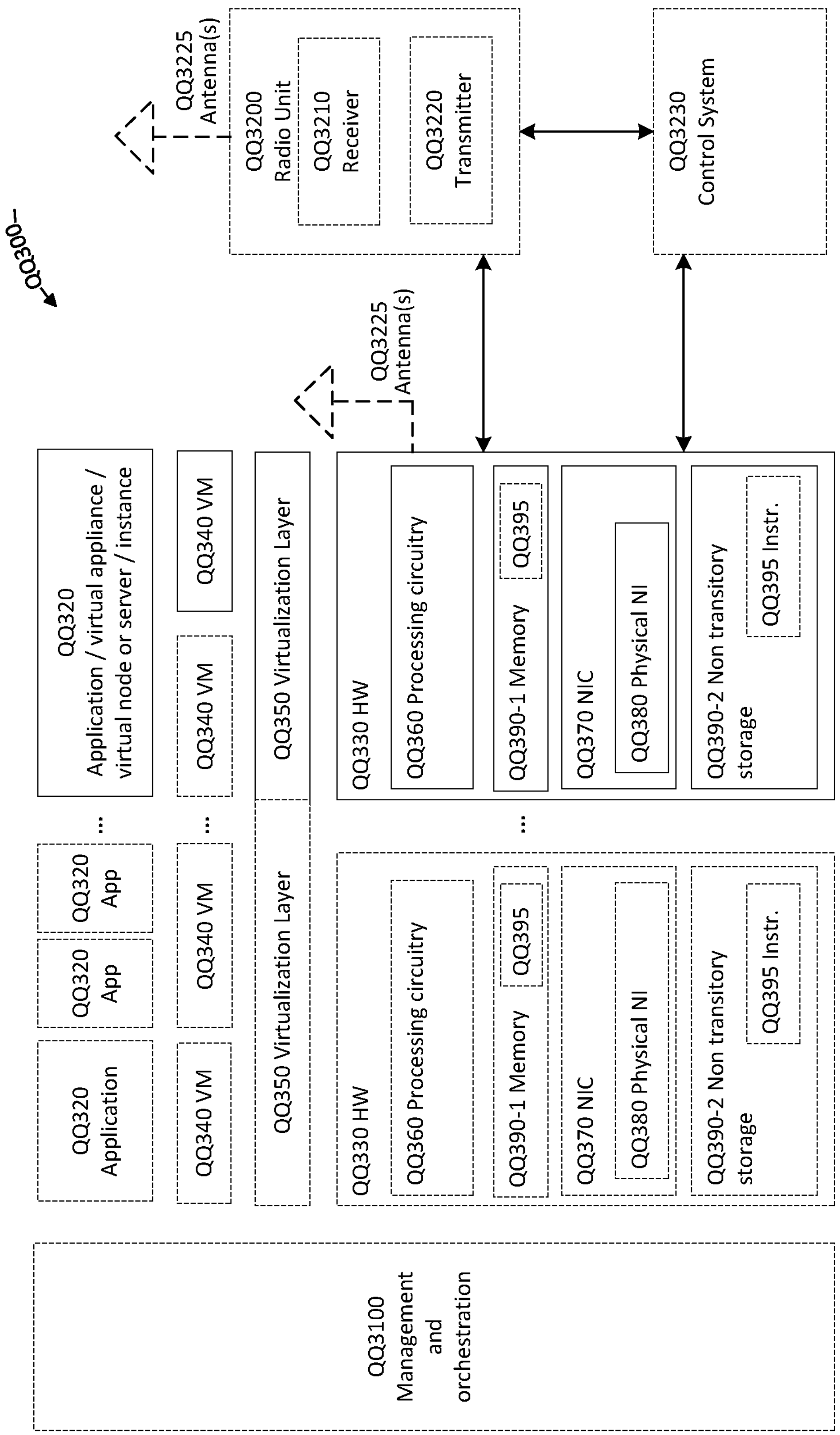
Figure 17:
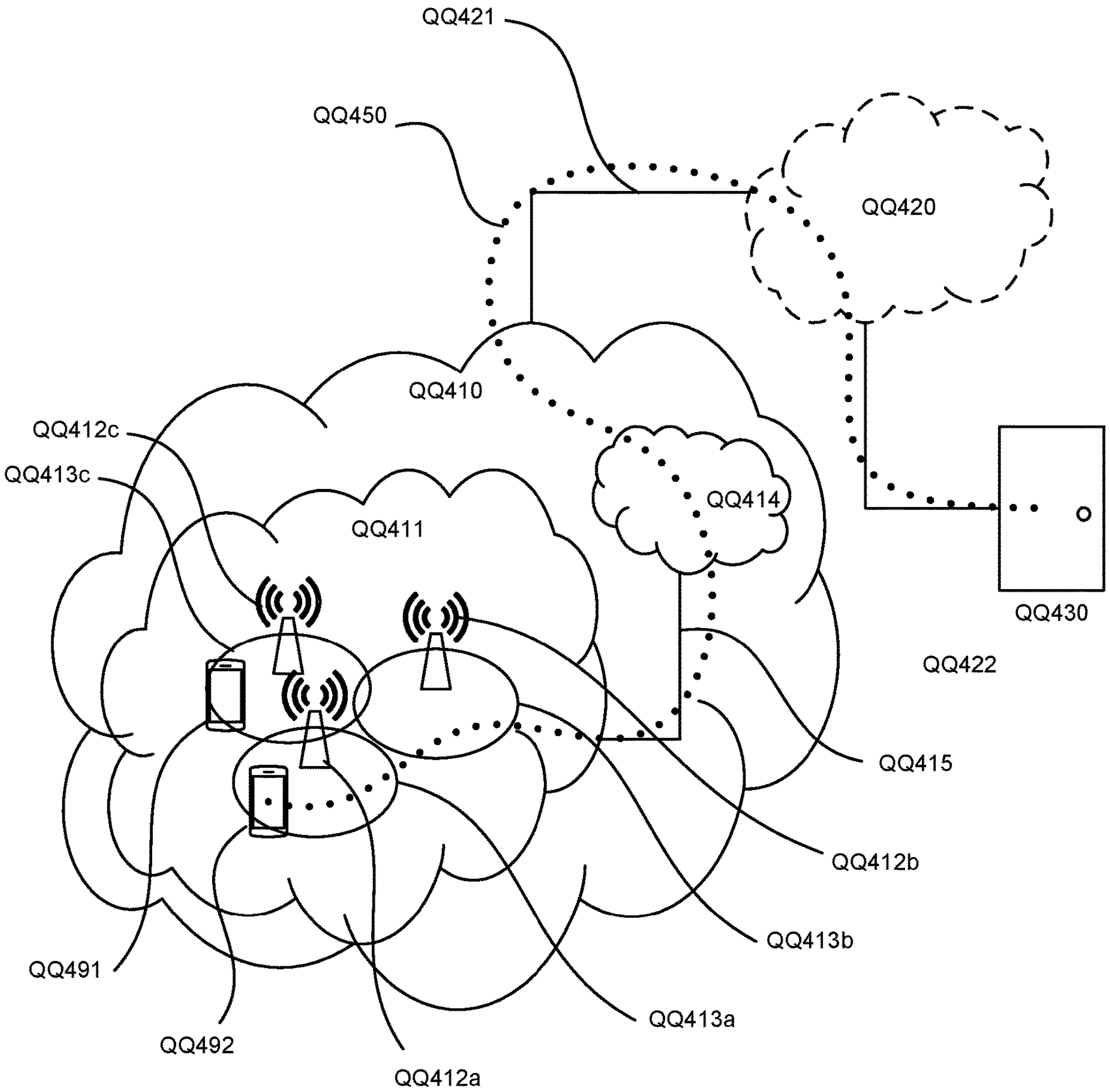
Figure 18:
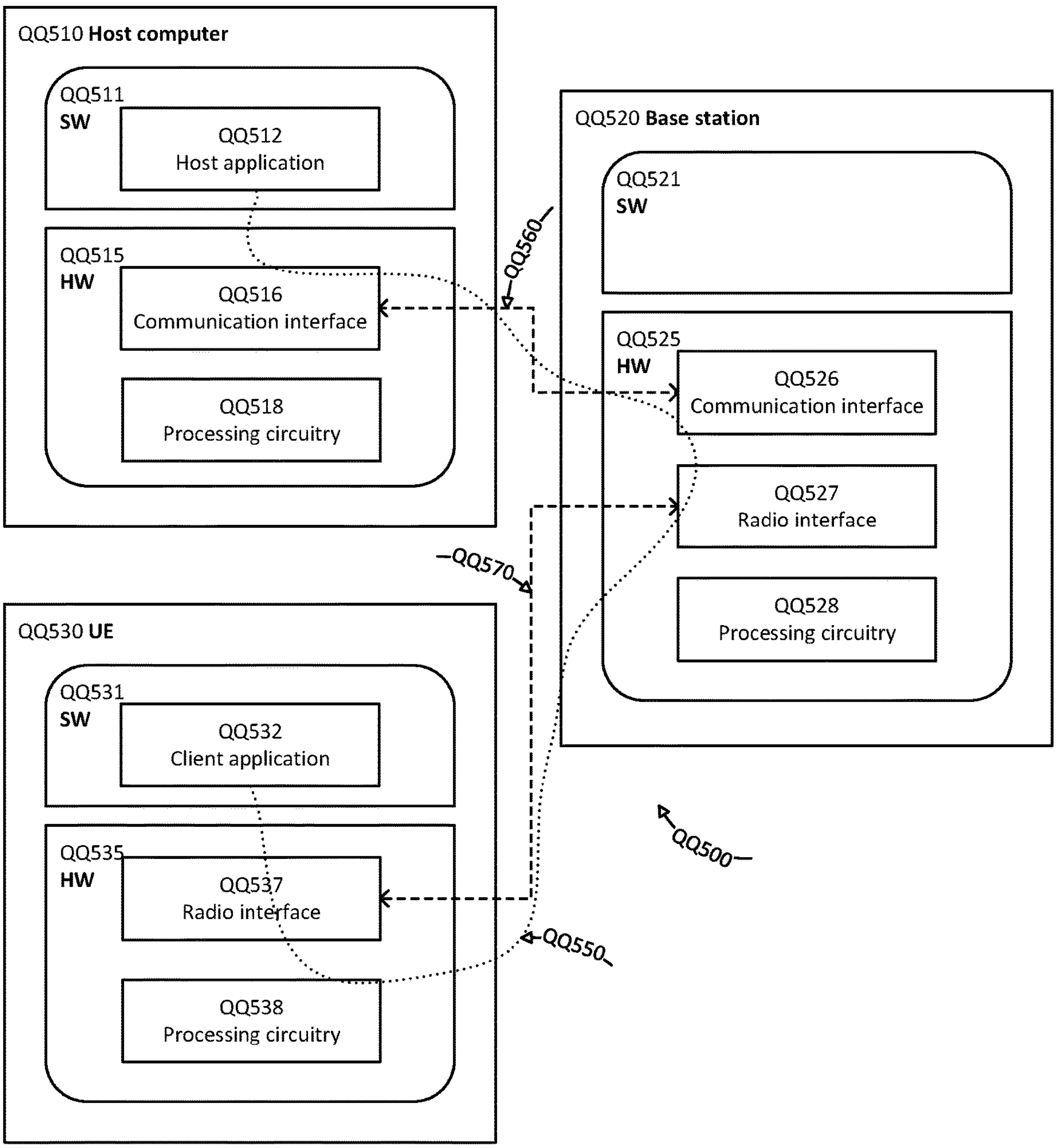
Figure 19:
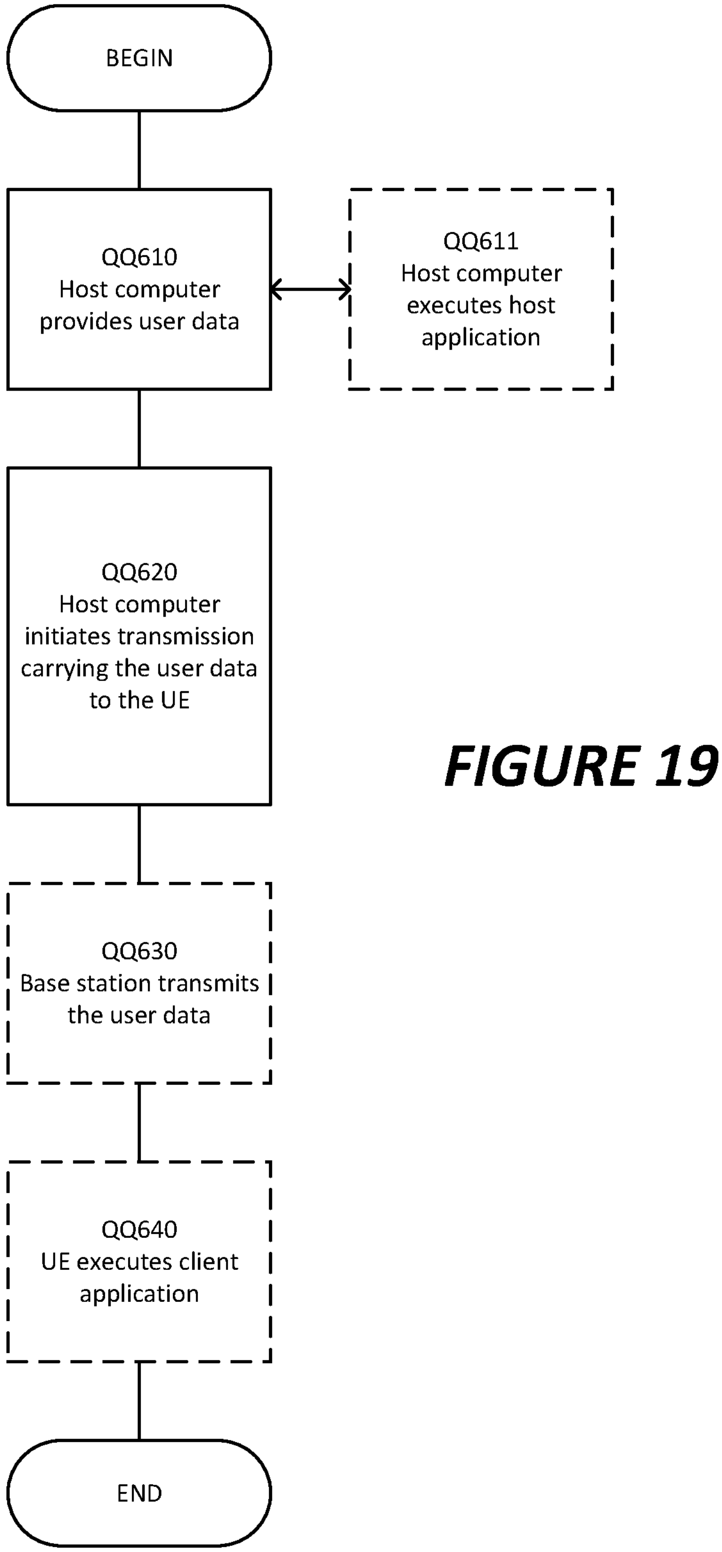
Figure 20:
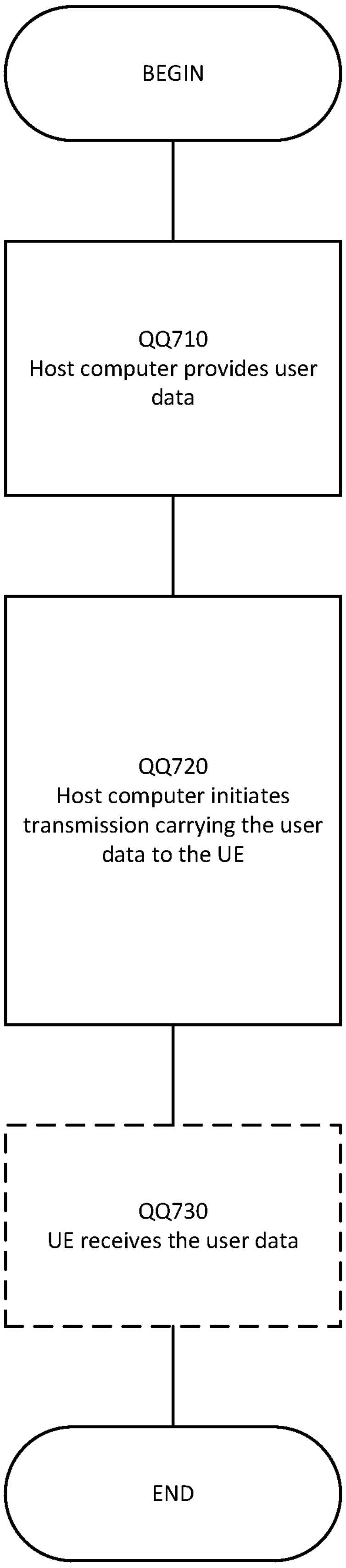
Figure 21:
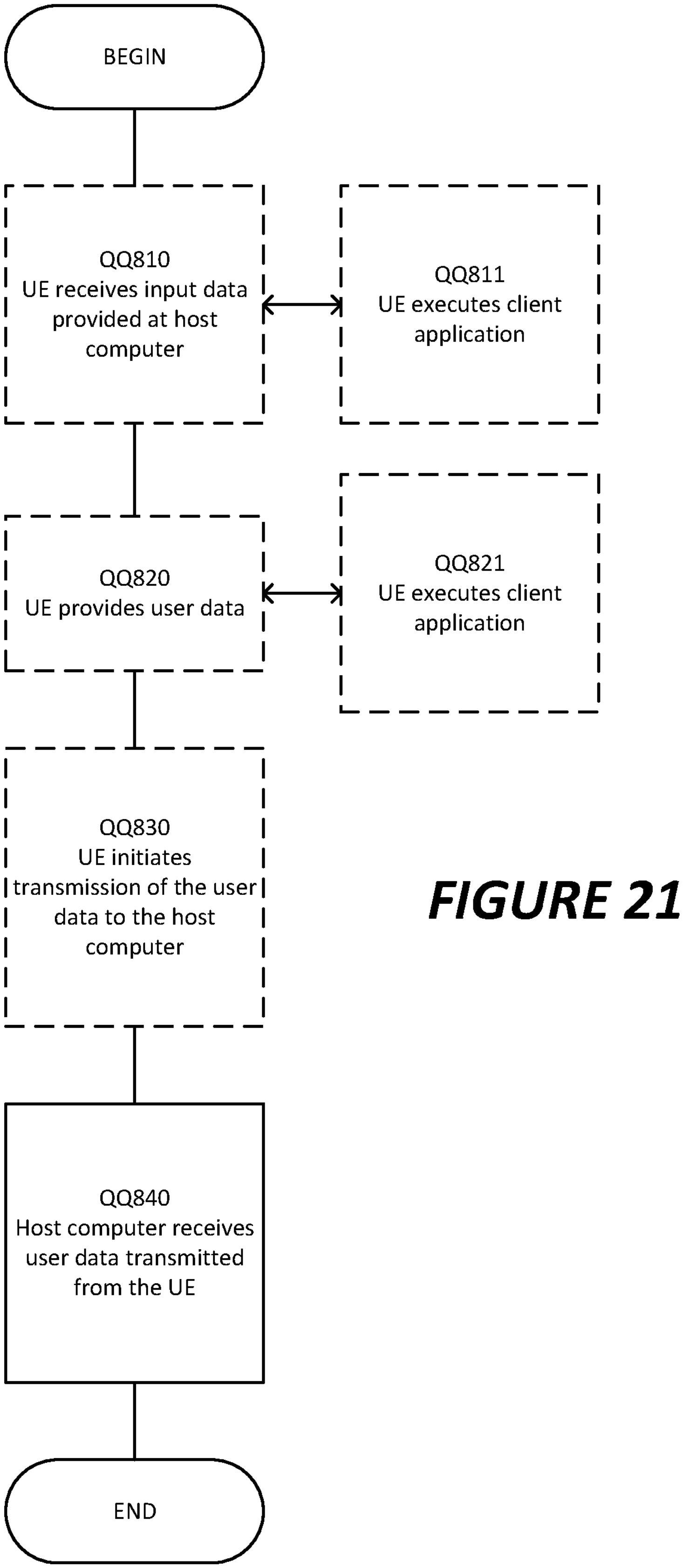
Figure 22:
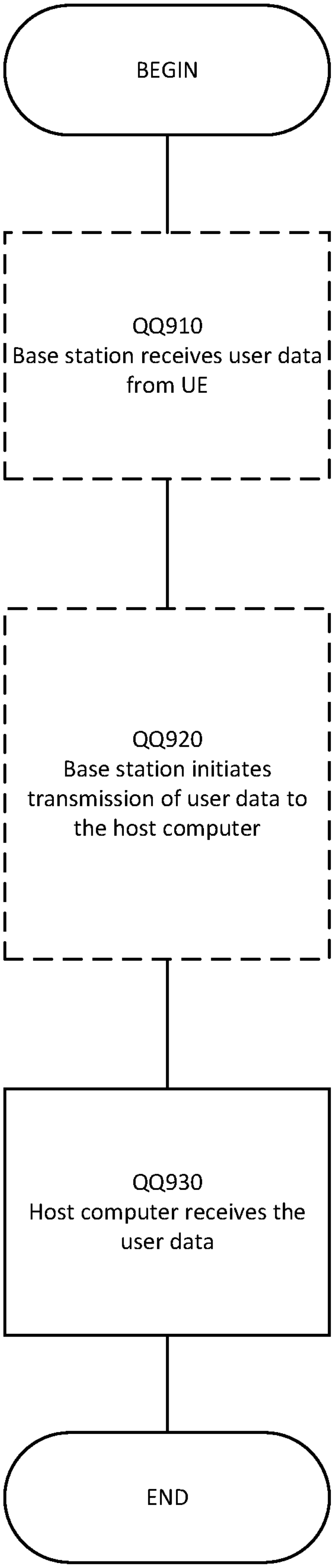

FIG. 14 is a block diagram of a wireless network in accordance with some embodiments;

FIG. 15 is a block diagram of a user equipment in accordance with some embodiments FIG. 16 is a block diagram of a virtualization environment in accordance with some embodiments;

FIG. 17 is a block diagram of a telecommunication network connected via an intermediate network to a host computer in accordance with some embodiments;

FIG. 18 is a block diagram of a host computer communicating via a base station with a user equipment over a partially wireless connection in accordance with some embodiments;

FIG. 19 is a block diagram of methods implemented in a communication system including a host computer, a base station, and a user equipment in accordance with some embodiments;

FIG. 20 is a block diagram of methods implemented in a communication system including a host computer, a base station, and a user equipment in accordance with some embodiments;

FIG. 21 is a block diagram of methods implemented in a communication system including a host computer, a base station, and a user equipment in accordance with some embodiments; and FIG. 22 is a block diagram of methods implemented in a communication system including a host computer, a base station, and a user equipment in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
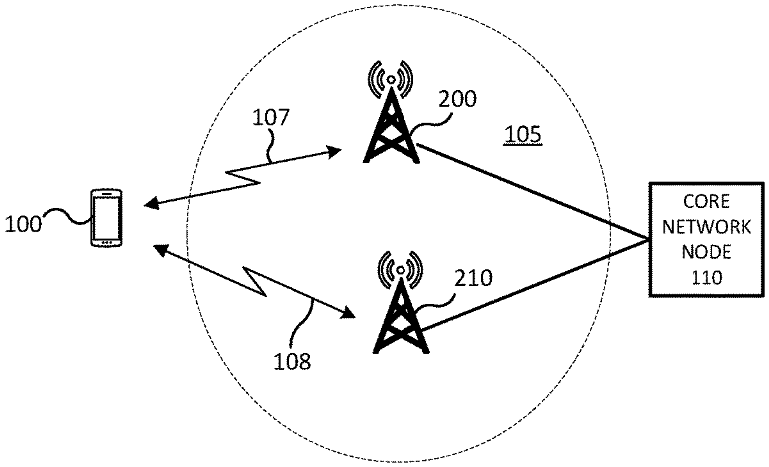
FIG. 1 illustrates a wireless communication system.

A simplified wireless communication system is illustrated in FIG. 1. The system includes a UE 100 that communicates with one or more access nodes 200, 210 using radio connections 107, 108. The access nodes 110, 120 are connected to a core network node 110. The access nodes 200, 210 are part of a radio access network 105.

For wireless communication systems pursuant to the 3GPP 5G System, 5GS (also referred to as New Radio, NR, or 5G) standard specifications, the access nodes 200, 210 correspond typically to a 5G NodeB (gNB) and the network node 110 corresponds typically to either an Access and Mobility Management Function AMF and/or a User Plane Function. The gNB is part of the radio access network 105, which in this case is the NG-RAN (Next Generation Radio Access Network), while the AMF and UPF are both part of the 5G Core Network (5GC).

The 5G System consists of the access network and the core network. The Access Network (AN) is the network that allows the UE 100 to gain connectivity to the Core Network (CN), e.g. the base station which could be a gNB or an ng-eNB in 5G. The CN contains all the network functions, ensuring a wide range of different functionalities such as session management, connection management, charging, authentication, etc.

The NR standard is designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

Figure 2:
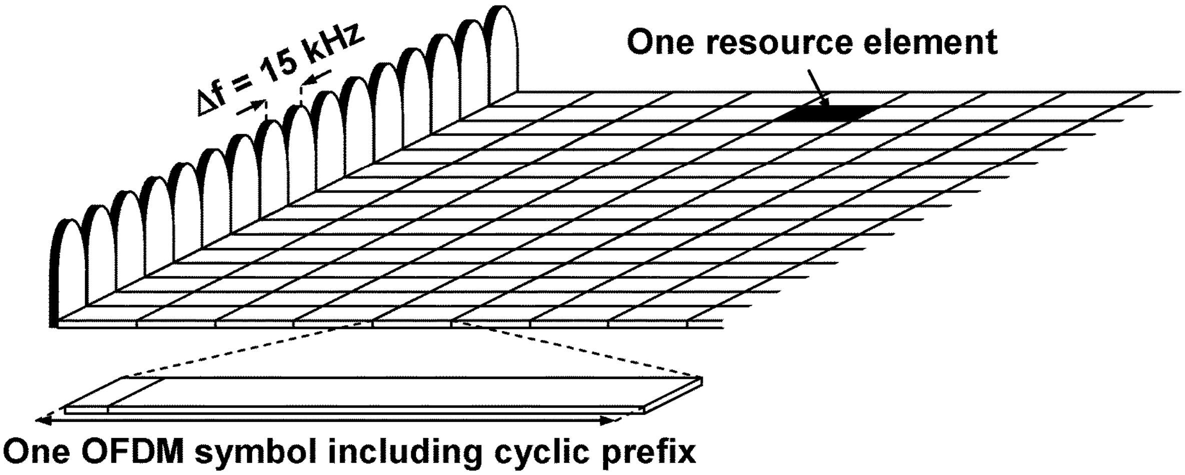
FIG. 2 illustrates an exemplary radio resource configuration for NR.

One of the solutions for low latency data transmission is shorter transmission time intervals. In NR in addition to transmission in a slot, a mini-slot transmission is also allowed to reduce latency. A mini-slot is a concept that is used in scheduling and in DL a min-slot can consist of 2, 4 or 7 OFDM symbols, while in UL a mini-slot can be any number of 1 to 14 OFDM symbols. It should be noted that the concepts of slot and mini-slot are not specific to a specific service, meaning that a mini-slot may be used for either eMBB, URLLC, or other services. An exemplary radio resource configuration for NR is illustrated in FIG. 2.

Downlink Control Information

In the 3GPP NR standard, downlink control information (DCI) which is transmitted in physical downlink control channel (PDCCH), is used to provide DL data related information, UL related information, power control information, slot format indication, etc., to a UE. There are different formats of DCI associated with each of these control signals, and the UE identifies the different DCI formats based on different radio network temporary identifiers (RNTIs).

A UE is configured by higher layer signaling to monitor for DCIs in different resources with different periodicities. DCI formats 1_0, 1_1, and 1_2 are used for scheduling DL data which is sent in physical downlink shared channel (PDSCH), and includes time and frequency resources for DL transmission, as well as modulation and coding information, HARQ (hybrid automatic repeat request) information, etc.

In case of DL semi-persistent scheduling (SPS) and UL configured grant type 2, part of the scheduling including the periodicity is provided by the higher layer configurations, while the remaining scheduling information, such as time domain and frequency domain resource allocation, modulation and coding, etc., is provided by the DCI in PDCCH.

Uplink Control Information

Uplink control information (UCI) is a control information sent by a UE to a gNB. It includes (a) Hybrid-ARQ acknowledgement (HARQ-ACK) which is a feedback information corresponding to the received downlink transport block whether the transport block reception is successful or not, (b) Channel state information (CSI) related to downlink channel conditions which provides gNB with channel-related information useful for DL scheduling, including information for multi-antenna and beamforming schemes, and (c) Scheduling requests (SR) which indicate a need of UL resources for UL data transmission.

UCI is typically transmitted on the physical uplink control channel (PUCCH). However, if a UE is transmitting data on the PUSCH with a valid PUSCH resource overlapping with PUCCH, UCI can be multiplexed with UL data and transmitted on PUSCH instead, if the timeline requirements for UCI multiplexing is met.

Physical Uplink Control Channel

The Physical Uplink Control Channel (PUCCH) is used by a UE to transmit HARQ-ACK feedback messages corresponding to the reception of DL data transmission. It is also used by the UE to send channel state information (CSI) or to request for an uplink grant for transmitting UL data.

In NR, there exist multiple PUCCH formats that support different UCI payload sizes. PUCCH formats 0 and 1 support UCI up to 2 bits, while PUCCH formats 2, 3, and 4 can support UCI of more than 2 bits. In terms of PUCCH transmission duration, PUCCH formats 0 and 2 are considered short PUCCH formats supporting PUCCH duration of 1 or 2 OFDM symbols, while PUCCH formats 1, 3, and 4 are considered as long formats and can support PUCCH duration from 4 to 14 symbols.

HARQ Feedback

The procedure for receiving downlink transmission is that the UE first monitors and decodes a PDCCH in slot n which points to DL data scheduled in slot n+K0 slots (where K0 is larger than or equal to 0). The UE then decodes the data in the corresponding PDSCH. Finally, based on the outcome of the decoding, the UE sends an acknowledgement of the correct decoding (ACK) or a negative acknowledgement (NACK) to the gNB at time slot n+K0+K1 (in case of slot aggregation n+K0 would be replaced by the slot where PDSCH ends). Both K0 and K1 are indicated in the DCI. The resources for sending the acknowledgement are indicated by a PUCCH resource indicator (PRI) field in the DCI, which points to one of PUCCH resources that are configured by higher layers.

Depending on DL/UL slot configurations, or whether carrier aggregation, or per code-block group (CBG) transmission used in the DL, the feedback for several PDSCHs may need to be multiplexed in one feedback message. This is done by constructing HARQ-ACK codebooks. In NR, the UE can be configured to multiplex the ACK/NACK bits using a semi-static codebook or a dynamic codebook.

Type 1 or semi-static codebook consists of a bit sequence where each element contains the ACK/NACK bit from a possible allocation in a certain slot, carrier, or transport block (TB). When the UE is configured with CBG and/or time-domain resource allocation (TDRA) table with multiple entries, multiple bits are generated per slot and TB. It is important to note that the codebook is derived regardless of the actual PDSCH scheduling. The size and format of the semi-static codebook is preconfigured based on the mentioned parameters. The drawback of semi-static HARQ ACK codebook is that the size is fixed, and regardless of whether there is a transmission or not a bit is reserved in the feedback matrix.

In the case when a UE has a TDRA table with multiple time-domain resource allocation entries configured, the table is pruned (i.e. entries are removed based on a specified algorithm) to derive a TDRA table that only contains non-overlapping time-domain allocations. One bit is then reserved in the HARQ codebook for each non-overlapping entry (assuming a UE is capable of supporting reception of multiple PDSCH in a slot).

To avoid reserving unnecessary bits in a semi-static HARQ codebook, in NR a UE can be configured to use a type 2 or dynamic HARQ codebook, where an ACK/NACK bit is present only if there is a corresponding transmission scheduled. To avoid any confusion between the gNB and the UE, on the number of PDSCHs that the UE has to send a feedback for, a counter downlink assignment indicator (DAI) field exists in DL assignment, which denotes accumulative number of {serving cell, PDCCH occasion} pairs in which a PDSCH is scheduled to a UE up to the current PDCCH. In addition to that, there is another field called total DAI, which when present shows the total number of {serving cell, PDCCH occasion} up to (and including) all PDCCHs of the current PDCCH monitoring occasion. The timing for sending HARQ feedback is determined based on both PDSCH transmission slot with reference to PDCCH slot (K0) and the PUCCH slot that contains HARQ feedback (K1).

Figure 3:
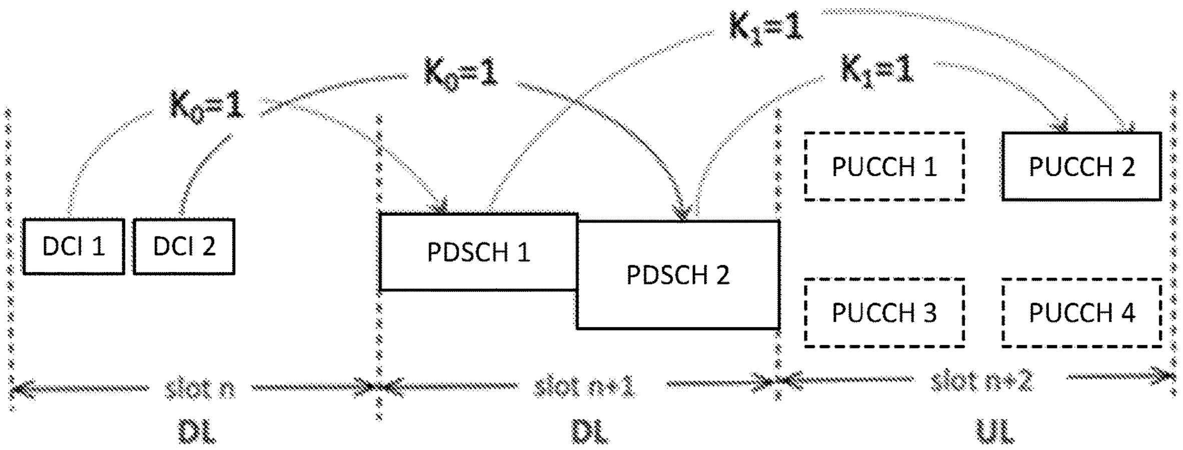
FIG. 3 illustrates a HARQ timeline in a scenario with two PDSCHs and one feedback message.

FIG. 3 illustrates a timeline in a simple scenario with two PDSCHs and one feedback message. In this example, there are a total of 4 PUCCH resources configured, and the PRI indicates that PUCCH 2 is to be used for HARQ feedback. PUCCH 2 is selected from 4 PUCCH resources based on the procedure defined in NR Rel-15.

In NR Rel-15, a UE can be configured with maximum of 4 PUCCH resource sets for transmission of HARQ-ACK information. Each set is associated with a range of UCI payload bits including HARQ-ACK bits. The first set is always associated to 1 or 2 HARQ-ACK bits and hence includes only PUCCH format 0 or 1 or both. The range of payload values (minimum of maximum values) for other sets, if configured, is provided by configuration except the maximum value for the last set where a default value is used, and the minimum value of the second set being 3. The first set can include maximum 32 PUCCH resources of PUCCH format 0 or 1. Other sets can include maximum 8 bits of format 2 or 3 or 4.

As described above, the UE determines a slot for transmission of HARQ-ACK bits in a PUCCH corresponding to PDSCHs scheduled or activated by DCI via a K1 value provided by configuration or in a field in the corresponding DCI. The UE forms a codebook from the HARQ-ACK bits with associated PUCCH in a same slot via corresponding K1 values.

The UE determines a PUCCH resource set that the size of the codebook is within the corresponding range of payload values associated to that set.

The UE determines a PUCCH resource in that set if the set is configured with maximum 8 PUCCH resources, by a field in the last DCI associated to the corresponding PDSCHs. If the set is the first set and is configured with more than 8 resources, a PUCCH resource in that set is determined by a field in the last DCI associated to the corresponding PDSCHs and implicit rules based on the CCE.

A PUCCH resource for HARQ-ACK transmission can overlap in time with other PUCCH resources for CSI and/or SR transmissions as well as PUSCH transmissions in a slot. In case of overlapping PUCCH and/or PUSCH resources, first the UE resolves overlapping between PUCCH resources, if any, by determining a PUCCH resource carrying the total UCI (including HARQ-ACK bits) such that the UCI multiplexing timeline requirements are met. There might be partial or completely dropping of CSI bits, if any, to multiplex the UCI in the determined PUCCH resource. Then, the UE resolves overlapping between PUCCH and PUSCH resources, if any, by multiplexing the UCI on the PUSCH resource if the timeline requirements for UCI multiplexing is met.

Cross-Carrier HARQ-ACK Feedback

In NR, when operating with carrier aggregation (CA), as a baseline, the HARQ-ACK feedback information (carried in a physical uplink control channel, PUCCH) for multiple downlink component carriers (CC) are transmitted on the primary cell (PCell). This is to support asymmetric CA with the number of downlink carriers unrelated to the number of uplink carriers.

Figure 4A:
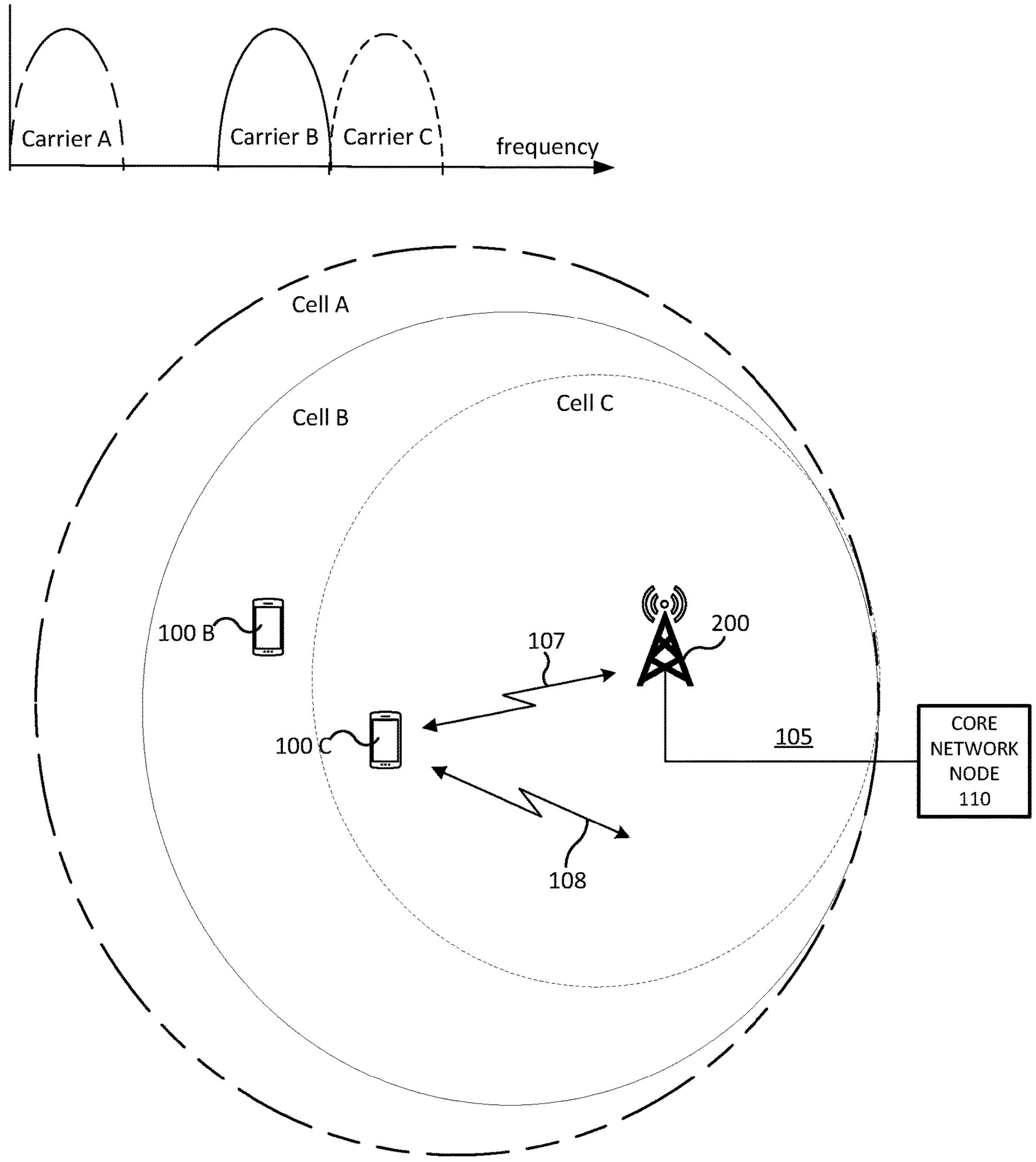
FIGS. 4A to 4D illustrate uplink ACK/NACK feedback for multiple PUCCH groups.

For carrier aggregation a number of serving cells are used. There is a serving cell for each component carrier. The properties of the serving cells may differ for example, the coverage of the serving cells may differ because CCs on different frequency bands will experience different pathloss, see FIG. 4A. The RRC connection is only handled by the Primary serving cell, served by the Primary component carrier (DL and UL PCC). It is also on the DL PCC that the UE receives NAS information, such as security parameters. PUCCH is sent on the UL PCC. The other component carriers are all referred to as Secondary component carriers (DL and UL SCC), serving the Secondary serving cells, see FIG. 4A. The SCCs are added and removed as required, while the PCC is only changed at handover. In some of the embodiments disclosed herein Component Carrier, Carrier, Cell and Serving Cell are interchangeably used. In the example shown in FIG. 4A carrier aggregation on all three component carriers can be used for the UE 100 C. UE 100 B is not within the coverage area of the cell A (component carrier A).

For a large number of downlink CCs, a single uplink carrier may have to carry a large number of HARQ-ACK feedbacks. Thus, to avoid overloading a single carrier, it is possible to configure two PUCCH groups (set of serving cells), where feedback messages relating to DL transmissions in the first PUCCH group are transmitted in the uplink of the PCell within the first PUCCH group, and feedback messages relating to the other PUCCH group are transmitted on the primary second cell (PSCell) or on a PUCCH-SCell of the second PUCCH group. In some embodiments the PUCCH group is a group of serving cells for which the PUCCH transmission is on the PCell or the PSCell or on the PUCCH-SCell.

Figure 4B:
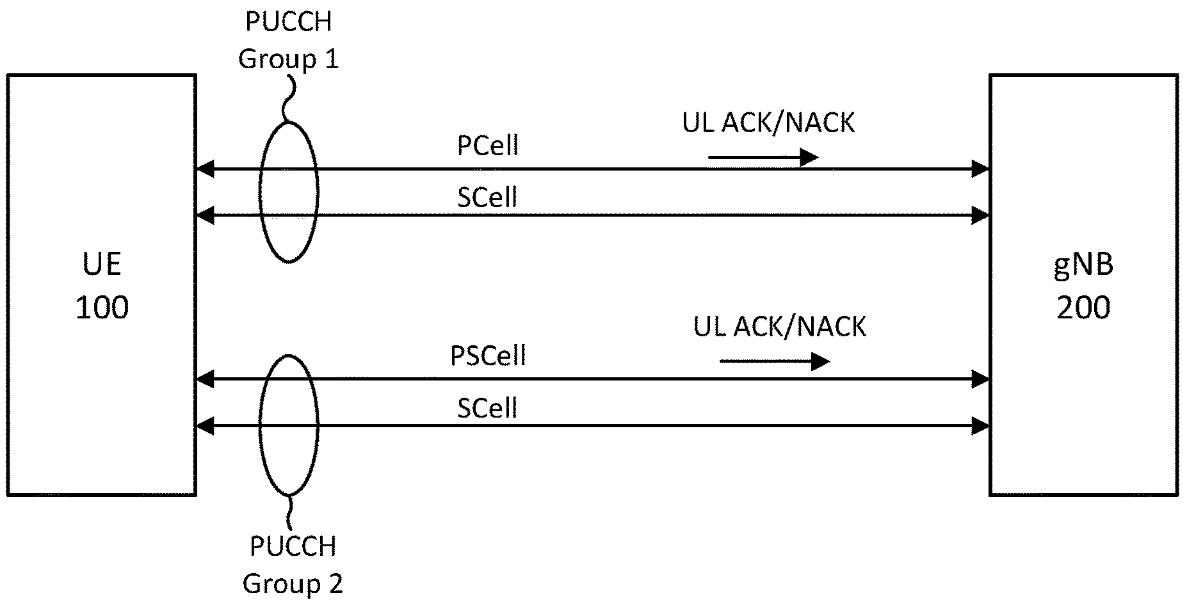

FIG. 4B illustrates a UE 100 which has two PUCCH groups configured for communication with a gNB 200. The first PUCCH group (PUCCH Group 1) includes a primary cell (PCell) and a secondary cell (SCell). Uplink ACK/NACK feedback for the first PUCCH group is carried on the uplink of PCell. The second PUCCH group (PUCCH Group 2) includes a primary second cell (PSCell) and a secondary cell (SCell). Uplink ACK/NACK feedback for the second PUCCH group is carried on the uplink of the PSCell.

Figure 4C:
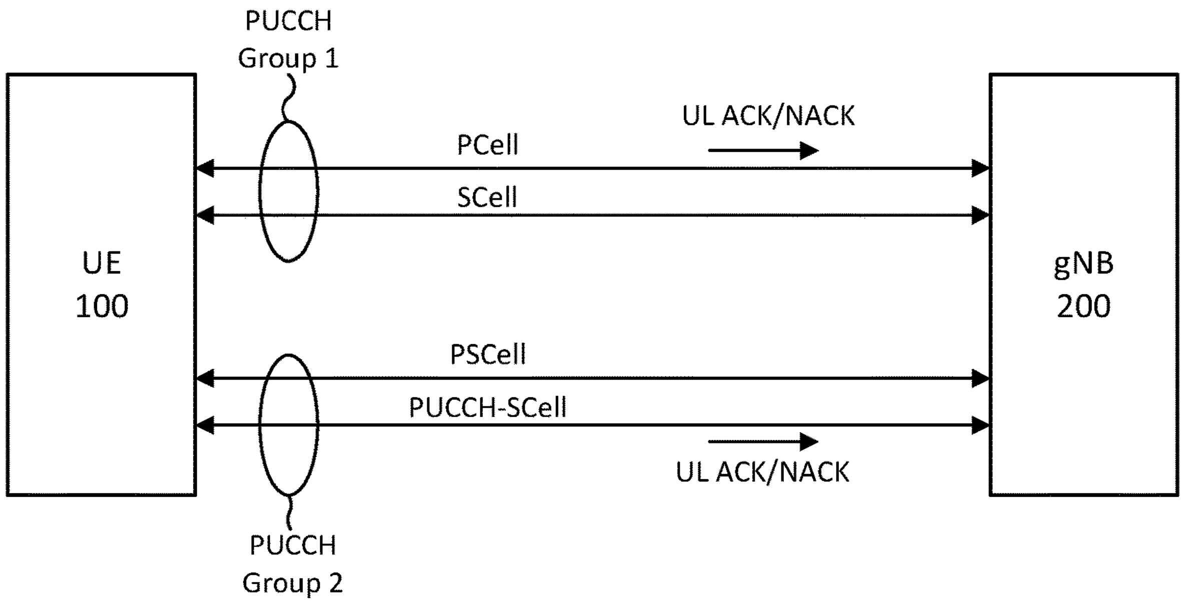

FIG. 4C also illustrates a UE 100 which has two PUCCH groups configured for communication with a gNB 200, where the first PUCCH group (PUCCH Group 1) includes a primary cell (PCell) and a secondary cell (SCell). Uplink ACK/NACK feedback for the first PUCCH group is carried on the uplink of the to PCell. The second PUCCH group (PUCCH Group 2) includes a primary second cell (PSCell) and a secondary cell (PUCCH-SCell) that is configured to carry UL ACK/NACK for the second PUCCH group.

It is possible to use another UL cell for HARQ-ACK feedback transmission by semi-statically configure a serving cell ID indicating a cell within the same PUCCH group to use for the HARQ-ACK transmission. However, such configuration is only possible for a newly added SCell. That is, for DL transmission on a PCell, HARQ-ACK transmission is only possible on the PCell.

Figure 4D:
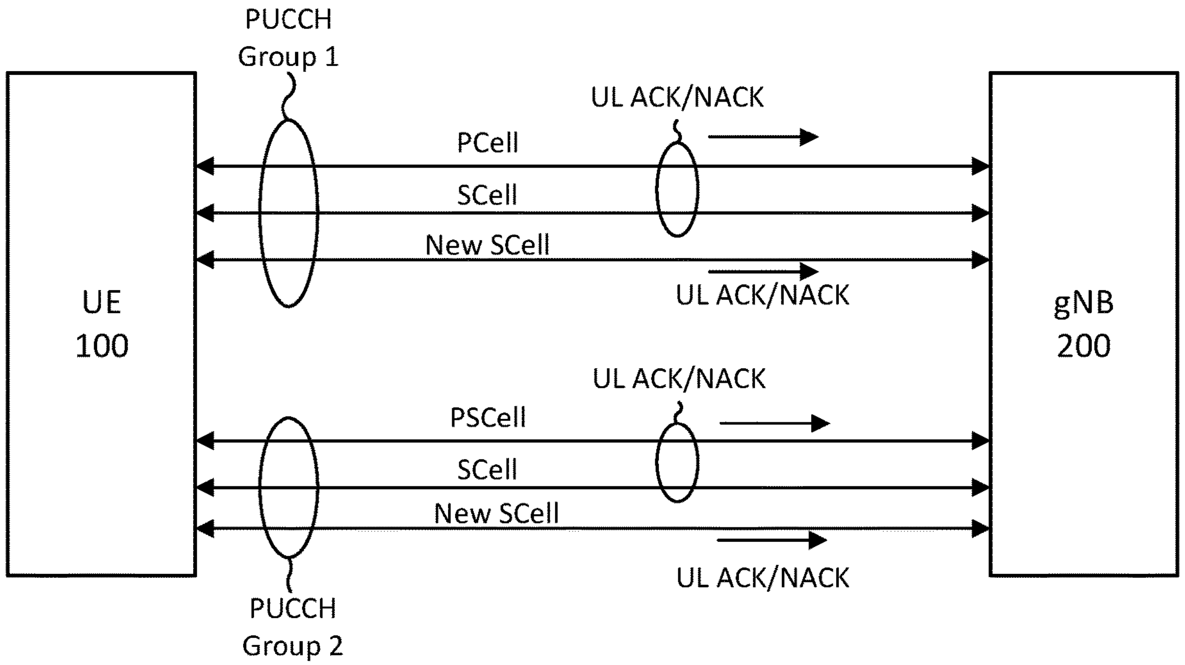

FIG. 4D illustrates a UE 100 which has two PUCCH groups configured for communication with a gNB 200. The first PUCCH group (PUCCH Group 1) includes a primary cell (PCell) and a secondary cell (SCell) for which uplink ACK/NACK feedback is carried on the uplink of the PCell. The first PUCCH group also includes a newly added SCell which carries its ACK/NACK feedback on its uplink.

The second PUCCH group (PUCCH Group 2) includes a primary second cell (PSCell) and a secondary cell (SCell) for which uplink ACK/NACK feedback is carried on the uplink of the PSCell. The second PUCCH group also includes a newly added SCell which carries its ACK/NACK feedback on its uplink.

Figure 5:
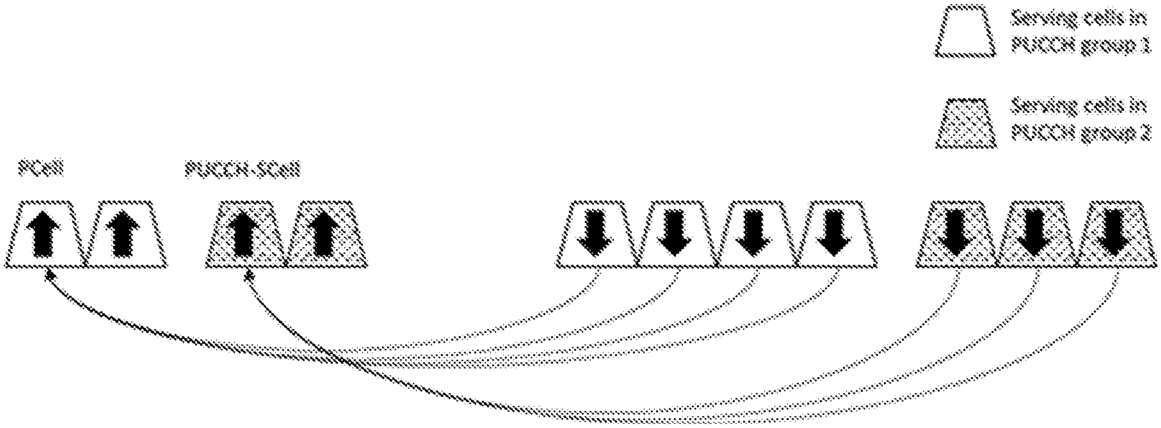
FIG. 5 illustrates an example of a HARQ-ACK feedback transmission mechanism with two PUCCH groups.

FIG. 5 shows an example of the HARQ-ACK feedback transmission mechanism with two PUCCH groups, in which the HARQ-ACK feedback for the first 4 DL CCs is transmitted in the UL PCell in the corresponding PUCCH group and the feedback for the last 3 DL CCs is transmitted in the PUCCH-SCell of the second PUCCH group. The PUCCH carrier or PUCCH cell would in the embodiments refer to the carrier, or cell, on which HARQ-ACK feedback is transmitted. Note that the term "carrier", "component carrier" and "cell" are used with similar meanings in the context of this disclosure.

Some embodiments described herein provide methods for flexible configuration, switching, and indication of a UL carrier for HARQ-ACK transmission in CA scenarios. Some embodiments provide solutions for PUCCH resource configuration, cell configuration, dynamic indication of UL cell, and HARQ-ACK codebook construction.

For example, in some embodiments, UL HARQ feedback messages may be carried on a UL carrier other than the default PCell or PUCCH-SCell of the corresponding PUCCH group. This can be useful, for example, to reduce the overall DL transmission latency which involves HARQ-ACK retransmission, which may be especially helpful in URLLC communications.

Embodiments described below can in general be applied to both slot-based PUCCH and sub-slot based PUCCH configurations. Embodiments described below may apply to both HARQ-ACK feedback of dynamically scheduled PDSCH and that of DL SPS. Moreover, various embodiments described herein may be combined.

A. Dynamic PUCCH Carrier Switching

1. Configuration of Dynamic PUCCH Carrier Switching Operation

In some embodiments, a UE may be semi-statically configured with a new RRC parameter to indicate that dynamic PUCCH carrier switching is allowed for HARQ-ACK feedback transmission. If the parameter is absent, then the legacy behavior as described above may be applied.

In some embodiments, the new RRC parameter to enable dynamic PUCCH carrier switching may be applied to a HARQ-ACK codebook with a certain index/priority (e.g. slot or sub-slot codebook).

In other embodiments, the dynamic PUCCH carrier switching operation may be enabled implicitly if the UE is configured with a PUCCH resource configuration for more than one carrier in a cell group or in any other way as described below.

2. PUCCH Resource Configurations for Dynamic PUCCH Carrier Switching

In some embodiment, different methods for PUCCH resource configuration for possible PUCCH carrier switching are provided.

In a first embodiment, a separate PUCCH configuration is configured (e.g., in BWP_UL_dedicated) for each UL cell within applicable UL cells for PUCCH. This implies that there are separate parameters for dl-DataToUL-ACK ($K_1$), PUCCH resource set configuration, and pucch-PowerControl configuration for each UL cell.

In a second embodiment, one RRC configuration with parameter PUCCH-config is provided to the UE (e.g., configured on PCell or PUCCH-SCell), but is applied to multiple UL cells, where in one version, one PUCCH-config is provided to UE for each PUCCH group and is applied to multiple UL cells within the corresponding PUCCH group, or in another version, one PUCCH-config is provided to UE and is applied to multiple UL cells across multiple PUCCH groups.

For the second embodiment described above, there can exist separate parameters intended for multiple cells within the PUCCH-config, e.g., separate dl-DataToUL-ACK (K1) configuration, separate PUCCH resource set configuration, and/or separate pucch-PowerControl configuration for each UL cell applicable for PUCCH transmission. The remaining parameters in the PUCCH configuration can be common for all UL cells.

As a related aspect of this embodiment, the entire PUCCH-FormatConfig IE in a PUCCH-config can be configured independently for each UL cell, or only a subset of parameters in PUCCH-FormatConfig, such as parameter Nrslots for PUCCH repetition, can be configured independently for each UL cell.

3. Configuration of Applicable UL Cells for HARQ-ACK Feedback with Dynamic PUCCH Carrier Switching In this embodiment, different methods for configuring applicable UL cells for HARQ-ACK feedback are provided. Let $$S_{UL,CC\#i}^{DL}$$

denote a set of applicable DL cells of which the DL transmission can have corresponding HARQ-ACK feedback sent on UL CC #i. Similarly, let $$S_{UL,CC\#j}^{DL}$$

denote a set of applicable UL cells on which HARQ-ACK feedback of DL transmission of DL CC #j can be sent.

In a first embodiment, each UL cell is configured with a set of applicable DL cells which can have a corresponding HARQ-ACK feedback sent on this UL cell.

Figure 6:
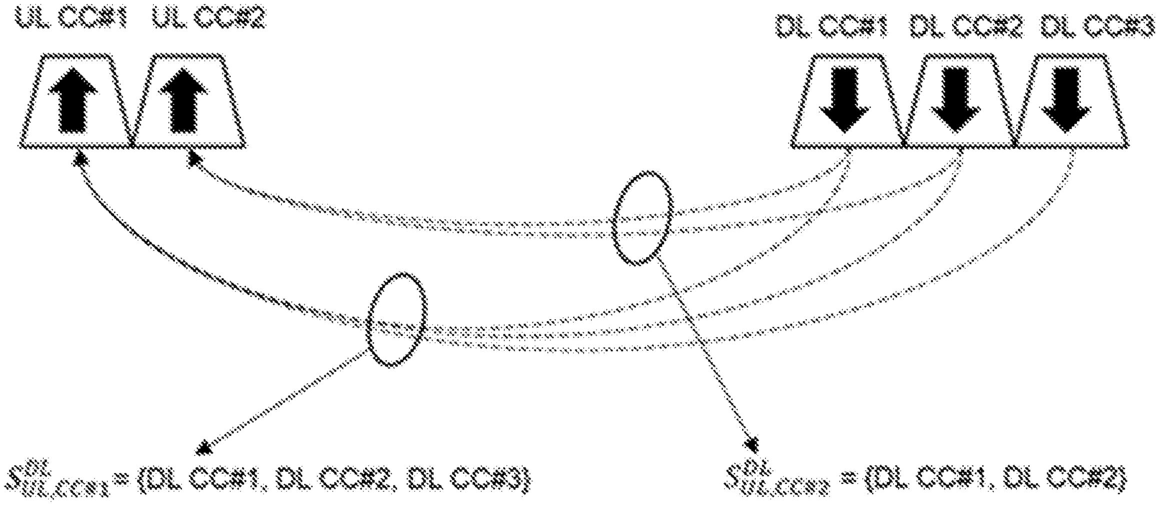
FIGS. 6, 7 and 8 illustrate examples of HARQ-ACK Feedback with Dynamic PUCCH Carrier Switching according to various embodiments.

Referring to FIG. 6, in a first example, a set of applicable DL cells $$S_{UL,CC\#i}^{DL}$$

is configured for each UL cell #i. The set of applicable DL cells can be configured in PUCCH-config IE which can be the common PUCCH-config or separate PUCCH-config as described above. In the example illustrated in FIG. 6, 3 DL cells and 2 UL cells are illustrated, where both UL cells can be used for HARQ-ACK transmission. UL cell #1 is configured with DL cells #1, #2, and #3 as applicable DL cells. Here, $$S_{UL,CC\#1}^{DL} = \{DL\ CC\#1,\ DL\ CC\#2,\ DL\ CC\#3\}.$$

Likewise, UL cell #2 is configured with only DL cells #1 and #2 as applicable DL cells. That is, $$S_{UL,CC\#2}^{DL} = \{DL\ CC\#1,\ DL\ CC\#2\}.$$

In a second embodiment, for each DL cell, a set of applicable UL cells which can be used for HARQ-ACK feedback for this DL cell is configured.

For example, a set of applicable UL cells for HARQ-ACK feedback $$S_{DL,CC\#j}^{UL}$$

may be configured for each DL cell #j. The set of applicable UL cells for HARQ-ACK feedback can be configured in PDSCH-config IE in BWP-DownlinkDedicated for each DL cell, or it can be configured in PDSCH-ServingCellConfig IE in ServingCellConfig for each DL cell.

Figure 7:
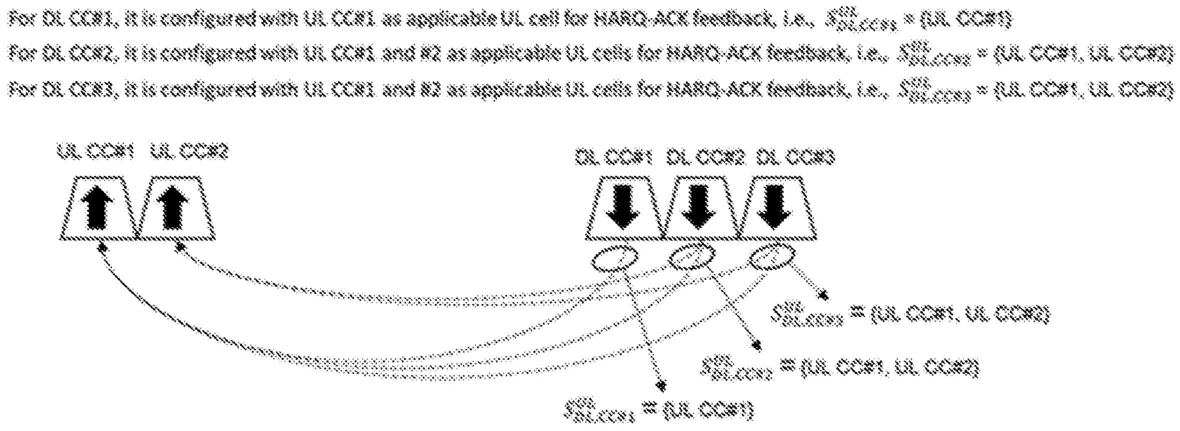

Referring to FIG. 7, an example is illustrated with 3 DL cells and 2 UL cells. In the example shown in FIG. 7, DL cell #1 is configured with only UL cell #1 as an applicable UL cell for HARQ-ACK feedback of DL transmission on DL cell #1, i.e., $$S_{DL,CC\#1}^{UL} = \{UL\ CC\#1\}.$$

DL cell #2 is configured with UL cell #1 and #2 as applicable UL cells for HARQ-ACK feedback of DL transmission on DL cell #2, i.e., $$S_{DL,CC\#2}^{UL} = \{UL\ CC\#1,\ UL\ CC\#2\}.$$

DL cell #3 is configured with UL cell #1 and #2 as applicable UL cells for HARQ-ACK feedback of DL transmission on DL cell #3, i.e., $$S_{DL,CC\#3}^{UL} = \{UL\ CC\#1,\ UL\ CC\#2\}.$$

In this case, it can also be derived that $$S_{UL,CC\#1}^{DL} = \{DL\ CC\#1,\ DL\ CC\#2,\ DL\ CC\#3\}$$

and $$S_{UL,CC\#2}^{DL} = \{DL\ CC\#2,\ DL\ CC\#3\}.$$

In a third embodiment, a set of applicable UL cells is configured which can be used for HARQ-ACK feedback corresponding to DL transmission in any DL cell.

For example, a set of applicable UL cells for HARQ-ACK feedback may be configured and can be applied to any DL cell. The set of applicable UL cells for HARQ-ACK feedback can be configured, for example, as part of the PUCCH-config IE.

Figure 8:
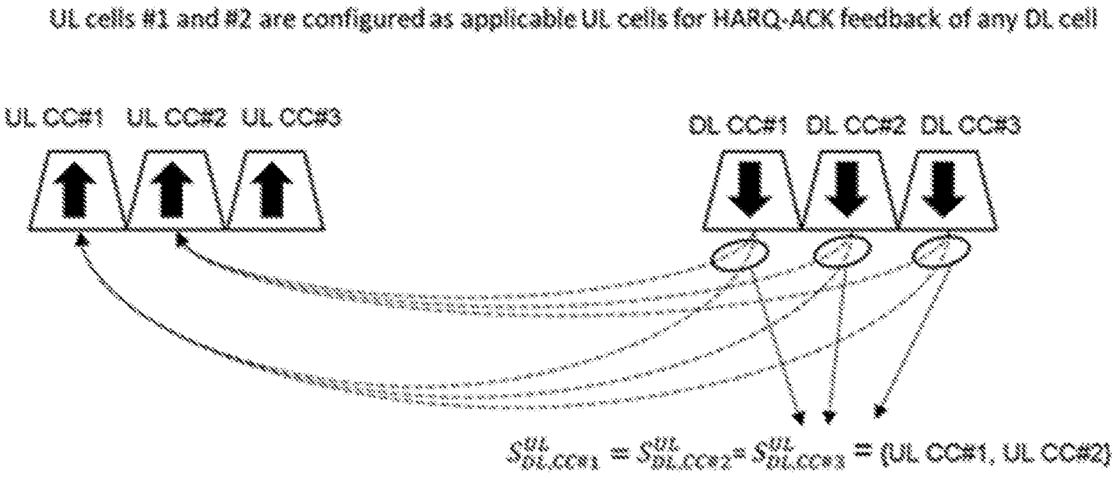

Referring to FIG. 8, an example is illustrated with 3 DL cells and 3 UL cells. In the example shown in FIG. 8, only UL cells #1 and #2 are configured as applicable UL cells for HARQ-ACK feedback, i.e., $$S_{DL,CC\#1}^{UL} = S_{DL,CC\#2}^{UL} = S_{DL,CC\#3}^{UL} = \{UL\ CC\#1,\ UL\ CC\#2\}.$$

In this case, it can also be derived that $$S_{UL,CC\#1}^{DL} = S_{UL,CC\#2}^{DL} = \{DL\ CC\#1,\ DL\ CC\#2,\ DL\ CC\#3\},$$

$$\text{and } S_{UL,CC\#3}^{DL} = \emptyset.$$

4. Type-1 HARQ-ACK Codebook Construction for Dynamic PUCCH Carrier Switching

In some embodiments, different methods for Type-1 HARQ-ACK codebook construction and codebook size determination for PUCCH carrier switching are provided.

To form a Type-1 HARQ-ACK codebook, first, the size of the HARQ-ACK codebook is determined. This corresponds to determining a set of $M_{A,c}$ occasions for candidate PDSCH receptions for which the UE can transmit corresponding HARQ-ACK information in a PUCCH in slot $n_U$.

Note that for dynamic PUCCH carrier switching, it is possible that the PDSCH receptions come from different DL cells. Therefore, the size of the Type-1 HARQ-ACK codebook for an UL cell #i depends also on the time-domain resource allocation tables associated with the active DL BWP of DL cells in the set of applicable DL cells, $$S_{UL,CC\#i}^{DL}$$

(DL cells that have this UL cell #i as appliable UL cell for HARQ-ACK feedback transmission).

In the following embodiments, procedures are described for codebook size determination of Type-1 HARQ-ACK codebook for an UL cell #i with dynamic PUCCH carrier switching.

For a set of slot timing values $K_1$ and a set of applicable DL cells, $$S_{UL,CC\#i}^{DL},$$

the UE determines a set of $M_{A,c}$ occasions for candidate PDSCH receptions for which the UE can transmit corresponding HARQ-ACK information in a PUCCH in slot $n_U$ by independent pruning of TDRA entries for each DL cell or by joint pruning of TDRA entries across DL as follows.

A procedure for independent pruning for each DL cell of TDRA entries includes:

For each $K_1$ (starting in descending order of the slot timing values $K_1$ in the set of $K_1$ For each DL cell in $$S_{UL,CC\#i}^{DL}$$

(starting in an ascending order of the cell indices in set $$S_{UL,CC\#i}^{DL}):$$

Prune out the entries in the TDRA table associated with the active BWP of the DL cell which result in PDSCH time resource having at least one symbol configured as an UL symbol. Here the PDSCH time resource is considered for the slot $n_U-K_1$, taking into account the slot timing $K_1$.

Further determine the number of non-overlapping PDSCH reception candidates within a slot from the remaining entries in the TDRA table, starting from the first TDRA index.

End for DL cell

End for $K_1$

A procedure for joint pruning of TDRA entries across DL cells includes:

For each $K_1$ (starting in descending order of the slot timing values, in set $K_1$ For each DL cell in $$S_{UL,CC\#i}^{DL}$$

(starting in an ascending order of the cell indices in set $$S_{UL,CC\#i}^{DL})$$

Prune out the entries in the TDRA table associated with the active BWP of the DL cell which result in PDSCH time resource having at least one symbol configured as an UL symbol. Here the PDSCH time resource is considered for the slot $n_U-K_1$, taking into account the slot timing $K_1$.

End for DL cell

Consider a union of all remaining TDRA entries after above step from the TDRA tables associated with DL cells in $$S_{UL,CC\#i}^{DL}.$$

Determine the number of non-overlapping PDSCH reception candidates within a slot from the union of TDRA entries, starting from the first TDRA index of the lowest DL cell index.

End for $K_1$

An example of codebook size determination of Type-1 HARQ-ACK codebook with dynamic PUCCH carrier switching using "Independent pruning for each DL cell of TDRA entries" method is given below.

Consider the example illustrated in FIG. 6 in which where there are 3 DL cells and 2 UL cells with $$S_{UL,CC\#1}^{DL} = \{DL\ CC\#1,\ DL\ CC\#2,\ DL\ CC\#3\}$$

and $$S_{UL,CC\#2}^{DL} = \{DL\ CC\#1,\ DL\ CC\#2\}.$$

Figure 9:
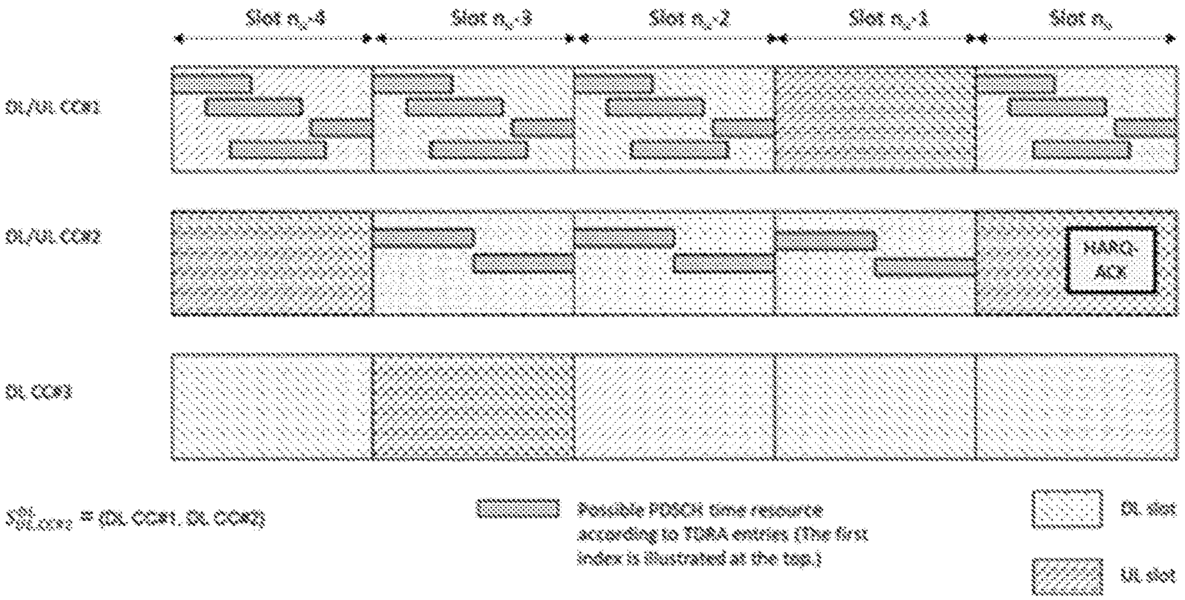
FIG. 9 illustrates possible PDSCH reception candidates according to TDRA entries for each DL cell in the set of applicable DL cells according to various embodiments.

FIG. 9 illustrates the determination of Type-1 HARQ-ACK codebook size for HARQ-ACK feedback sent in slot $n_U$ on UL CC #2. In particular, FIG. 9 illustrates possible PDSCH reception candidates according to TDRA entries for each DL cell in the set of applicable DL cells, $$S_{UL,CC\#2}^{DL} = \{DL\ CC\#1,\ DL\ CC\#2\}.$$

Assuming that the set of K1 values for PUCCH-config for UL CC #2 is {1,2,3,4}. With the set of $K_1$ values {1,2,3,4} and the set of applicable DL cells, $$S_{UL,CC\#2}^{DL} = \{DL\ CC\#1,\ DL\ CC\#2\},$$

the UE determines a set of occasions for candidate PDSCH receptions for which the UE can transmit corresponding HARQ-ACK information in a PUCCH in slot $n_U$ as follows.

1. First, start with $K_1=4$. This corresponds to considering slot $n_U-4$. Here, only PDSCH reception candidates from DL CC #1 are valid since all PDSCH reception candidates from DL cell #2 would lie in an UL slot of DL CC #2. Then the number of non-overlapping PDSCH reception candidates from the TDRA entries in the TDRA table associated with the active BWP of DL cell #1 can be determined to be 2 candidates.
2. Next for $K_1=3$ (slot $n_U-3$), PDSCH reception candidates from both DL cell #1 and #2 are valid since they correspond to valid DL slots. For DL cell #1, there are 2 non-overlapping PDSCH reception candidates, whereas for DL cell #2, there are another 2 non-overlapping candidates.
3. For $K_1=2$ (slot $n_U-2$), PDSCH reception candidates from both DL cell #1 and #2 are valid. Similarly, for DL cell #1, there are 2 non-overlapping PDSCH reception candidates, whereas for DL cell #2, there are another 2 non-overlapping candidates.
4. Lastly, for $K_1=1$ (slot $n_U-1$), only PDSCH reception candidates from DL CC #2 are valid since all PDSCH reception candidates from DL cell #1 would lie in an UL slot of DL CC #1. Here, there are 2 non-overlapping PDSCH reception candidates.

In total, there are 2+4+4+2=12 possible PDSCH reception candidates which can have the HARQ-ACK feedback sent in slot $n_U$ on UL cell #2.

Note that DL CC #3 is not considered since it is not an applicable DL cell which can have corresponding HARQ-ACK sent on UL CC #2 in the above example.

If the method "Joint pruning of TDRA entries across DL cells" is used instead in the example above, the steps 2) and 3) would be modified, where the union of TDRA entries of TDRA tables 1 and 2 are considered. This would result in having 2 non-overlapping PDSCH reception candidates across DL cells #1 and #2 in slot $n_U$–3 and $n_U$–2. And the total number of PDSCH reception candidates having the HARQ-ACK feedback sent in slot $n_U$ on UL CC #2 would be 8 instead.

The above methods for Type-1 HARQ-ACK codebook construction and size determination can also be extended to the case where DL and UL cells have different subcarrier spacing (SCS).

5. Indication in the DCI to Trigger HARQ-ACK Feedback on Another UL Cell

In this embodiment, methods for dynamic indication of the UL cell/Carrier to use for HARQ-ACK feedback transmission are provided.

In one embodiment, the indication is provided through the existing PUCCH resource indictor (PRI) field in DCI formats 1_0, 1_1, and/or 1_2. In this embodiment, serving cell ID information can be included as part of the PUCCH resource configuration using a new RRC parameter. If the indicated PUCCH resource contains this UL cell ID information, then it indicates the UL cell to use for the corresponding HARQ-ACK feedback. Table 1 below illustrates an example of a new RRC parameter in PUCCH-Resource indicating UL cell to use for the corresponding HARQ-ACK feedback.

TABLE 1

| PUCCH-Resource | |
|---|---|
| PUCCH-Resource ::= | SEQUENCE { |
| pucch-ResourceId | PUCCH-ResourceId, |
| starting PRB | PRB-Id, |
| intraSlotFrequencyHoppiung | ENUMERATED { enabled } |
| secondHopPRB | PRB-Id |
| format | CHOICE { |
| format0 | PUCCH-format0, |
| format1 | PUCCH-format1, |

TABLE 1-continued

| PUCCH-Resource | |
|---|---|
| format2 | PUCCH-format2, |
| format3 | PUCCH-format3, |
| format4 | PUCCH-format4 |
| } | |
| pucch_Cell | ServeCellIndex |
| } | |

In another embodiment, a separate DCI field is provided in DCI formats 1_0, 1_1, and/or 1_2 to select one of multiple cell ID values of applicable UL cells to use for HARQ-ACK transmission.

In this embodiment, if no indication of UL carrier for HARQ-ACK feedback exists, it is assumed that the PCell or PUCCH-SCell of the corresponding PUCCH group is used by default.

In another embodiment, the UL carriers/cell for HARQ-ACK is/are not indicated, and instead the carrier/cell is determined in the order of the UL serving cells. That is, the UE assumes that the PCell is used for HARQ-ACK feedback, and if there is no UL slot available on PCell then the UE chooses the PScell or PUCCH-SCell. If there is no UL slot available in the PSCell or the PUCCH-SCell, then the UE chooses SCell1, etc.

For PUCCH carrier indication for HARQ-ACK feedback of semi-persistent scheduling (SPS) PDSCH, the indication can be included in the activation DCI of each SPS configuration.

In another embodiment, two possible PUCCH cell indices are provided via pucch-Cell-r17 in the RRC configuration of PDSCH-ServingCellConfig IE as illustrated in the example in Table 2 below. When two serving cells are provided as illustrated, then 1 bit in a PDSCH scheduling DCI (e.g., DCI format 1_1, 1_2) can be used to select one of the two PUCCH cells. If bit value=0, then the first serving cell index in the sequence is selected; otherwise (bit value=1), then the second serving cell index in the sequence is selected.

The 1-bit in the PDSCH scheduling DCI can be an optionally configured field that is dedicated to dynamic PUCCH cell indication. Alternatively, 1-bit of an existing DCI field (e.g., PRI) can be used to provide dynamic PUCCH cell indication. In another option, an implicit indication in the DCI can be used to provide the equivalent 1-bit indication.

TABLE 2

| PDSCH-ServingCellConfig information element | |
|---|---|
| -- ASN1START | |
| -- TAG-PDSCH-SERVINGCELLCONFIG-START | |
| PDSCH-ServingCellConfig ::= | SEQUENCE { |
| codeBlockGroupTransmission | SetupRelease { PDSCH- |
| CodeBlockGroupTransmission | OPTIONAL, -- Need M |
| xOverhead | ENUMERATED { xOh6, xOh12, xOh18 } |
| OPTIONAL, -- Need S | |
| nrofHARQ-ProcessesForPDSCH | ENUMERATED {n2, n4, n6, n10, n12, n16} |
| OPTIONAL, -- Need S | |
| pucch-Cell | ServCellIndex |
| OPTIONAL, -- Cond SCellAddOnly | |
| ..., | |
| pucch-Cell-r17 | SEQUENCE (SIZE (2)) OF ServCellIndex |
| OPTIONAL, -- Cond SCellAddOnly | |
| ... | |
| } | |

6. Timing Restriction

In this embodiment, additional timing constraints are imposed to UE processing time when it operates with dynamic PUCCH carrier switching.

In one embodiment, an extra time offset, Δ, is added to $T_{proc,1}$ when the UE is configured to operate with dynamic PUCCH carrier switching. That is, the time gap between the end of PDSCH and the start of PUCCH carrying HARQ-ACK corresponding to the PDSCH is required to be at least $T_{proc,1}+\Delta$.

In one version of this embodiment, the time offset Δ can be SCS-dependent. The SCS for which Δ is considered is with respect to SCS of the UL cell used for HARQ-ACK feedback.

In another version, the time offset Δ depends on UE processing time capability. For example, different Δ values are defined for UE processing time capability #1 and #2. Or the time offset Δ values for different SCS are reported as part of the UE capability reporting.

7. UE Feature Restriction

In this embodiment, additional UE feature restrictions are defined/introduced for UE operating with dynamic PUCCH carrier switching.

In one aspect, dynamic PUCCH carrier indication is restricted to only indicating an UL cell in the same PUCCH groups as the DL cell of the corresponding DL transmission.

In another aspect, dynamic PUCCH carrier indication is restricted to only indicating an UL cell with smallest or largest SCS in the same PUCCH group.

In another aspect, dynamic PUCCH carrier indication is restricted to be used with configured/defined priority indicator (or codebook index) in a way that dynamic PUCCH carrier indication is allowed only for one CB index/priority and is not allowed for another CB index/priority.

In another aspect, there exists a maximum number of total applicable UL cells to use for HARQ-ACK feedback on PUCCH. The maximum number can be per PUCCH group. It can be part of UE capability.

8. Slot and Sub-Slot PUCCH

In case when multiple HARQ-ACK codebooks (CBs) are configured to UE, e.g. slot-based or sub-slot-based, the dynamic PUCCH carrier can be configured to only one CB, e.g. only sub-slot, or to both CBs. In this case UE should apply carrier switching for HARQ-ACK CB(s) of only certain index/priority. At the same time UE may not expect to apply dynamic switch to the HARQ-ACK CB for which dynamic PUCCH carrier switch is not configured/allowed.

In one embodiment, if only one (first) CB transmission is switched to another carrier and another (second) CB is not, UE should proceed with prioritization procedure between two CBs and disregard one of the PUCCH transmission on one carrier based on: HARQ-ACK CB priority or index; is HARQ-ACK CB dynamically switched PUCCH or not (e.g. dynamically switched PUCCH carrier may always have high priority), carrier/cell index.

In another embodiment, if only one CB transmission is switched to another carrier and another (second) CB is not, UE should proceed with multiplexing procedure and switch transmission of both HARQ-ACK. In this case multiplexing procedure can be modified in several ways. For example, the second CB can be multiplexed only if there is a room in PUCCH transport block. Alternatively or additionally, the second CB can be compressed (e.g. by bitwise AND operation) before multiplexing.

9. MAC CE for Activating/Deactivating Dynamic PUCCH Carrier Switching

Figure 10:
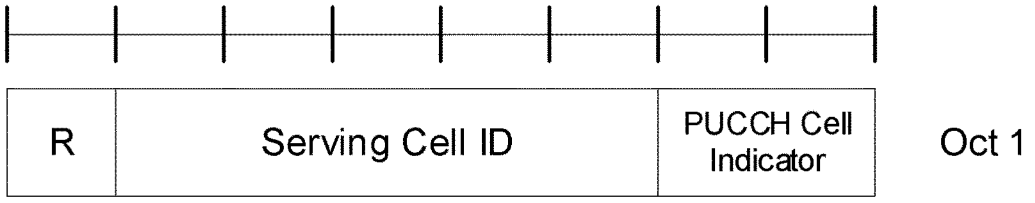
FIGS. 10 and 11 illustrate PUCCH cell activation/deactivation MAC Control Elements according to various embodiments.

In one embodiment, a MAC CE is used to activate and/or deactivate PUCCH carrier switching. One example of the PUCCH cell activation/deactivation MAC CE is illustrated in FIG. 10, in which a PUCCH cell for one PDSCH serving cell is shown. The fields are Serving Cell ID, PUCCH Cell Indicator and a reserved bit R.

The Serving Cell ID field indicates the identity of the PDSCH serving cell for which the MAC CE applies. The length of the field is 5 bits;

The PUCCH Cell Indicator field indicates the UL serving cell where the HARQ-ACK for the PDSCH on the Serving Cell are carried. In some embodiments, "PUCCH Cell Indicator" is 1-bit, where value '0' indicates PCell, value '1' indicates SpCell of this cell group or a PUCCH SCell. In other embodiments, "PUCCH Cell Indicator" is 2-bit, and up to 4 PUCCH cells can be indicated. Value '0' indicates PCell. The illustration below assumes 2-bit "PUCCH Cell Indicator".

The Reserved bit R is set to 0. R is 1-bit if "PUCCH Cell Indicator" is 2-bit. R is 2-bit if "PUCCH Cell Indicator" is 1-bit.

Figure 11:
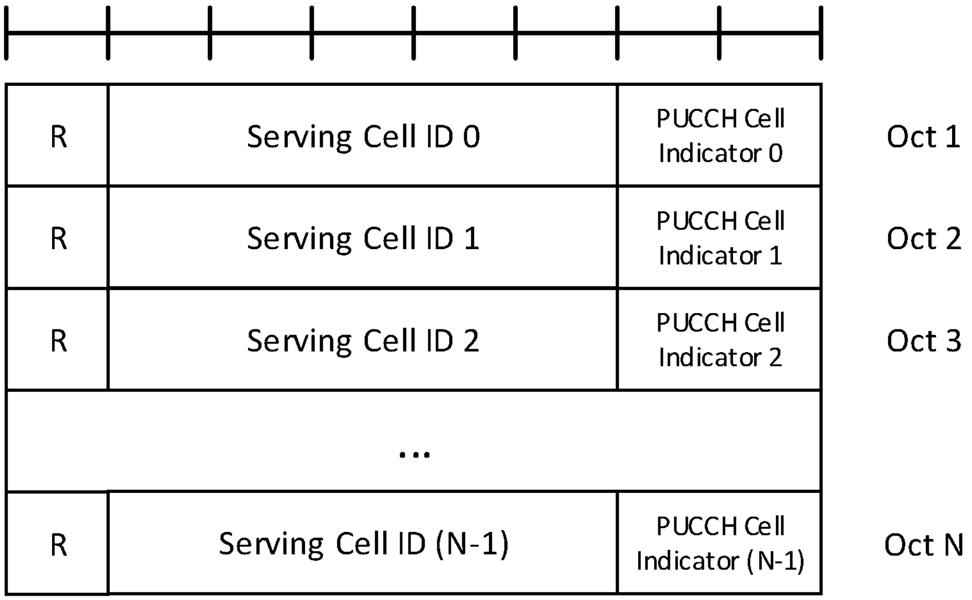

Another example of the PUCCH cell activation/deactivation MAC CE is illustrated in FIG. 11, in which PUCCH cells for N PDSCH serving cells, N>1, are shown. The meaning of the fields are similar to those shown in FIG. 10.

Correspondingly, a new eLCID is provided for this new MAC CE. One example is provided in Table 3 below.

TABLE 3

| LCID for New MAC CE | | |
|---|---|---|
| Codepoint | Index | LCID values |
| A value between 0 and 244 | A value between 64 and 308 | PUCCH Cell Activation/ Deactivation |

If no MAC CE is sent for a given PDSCH serving cell, then the PUCCH cell for this PDSCH serving cell is according to the RRC configured pucch-Cell in PDSCH-ServingCellConfig.

B. Semi-Static PUCCH Carrier Switching

Several embodiments described above, Sections A.2, A.3 and A.4 also apply to PUCCH carrier switching in a semi-static manner.

For example, a configuration of applicable UL cells for HARQ-ACK feedback described in Section A.3 can be specialized to the case where the set of applicable UL cells for each DL cell #j, $$S_{DL,CC\#j}^{UL}$$

contains only one value, indicating a specific UL cell to use for HARQ-ACK feedback of DL transmission on DL cell #j. This includes, for example, a possibility to configure any UL cell to use for HARQ-ACK feedback corresponding to DL transmission on a DL PCell.

Figure 12A:
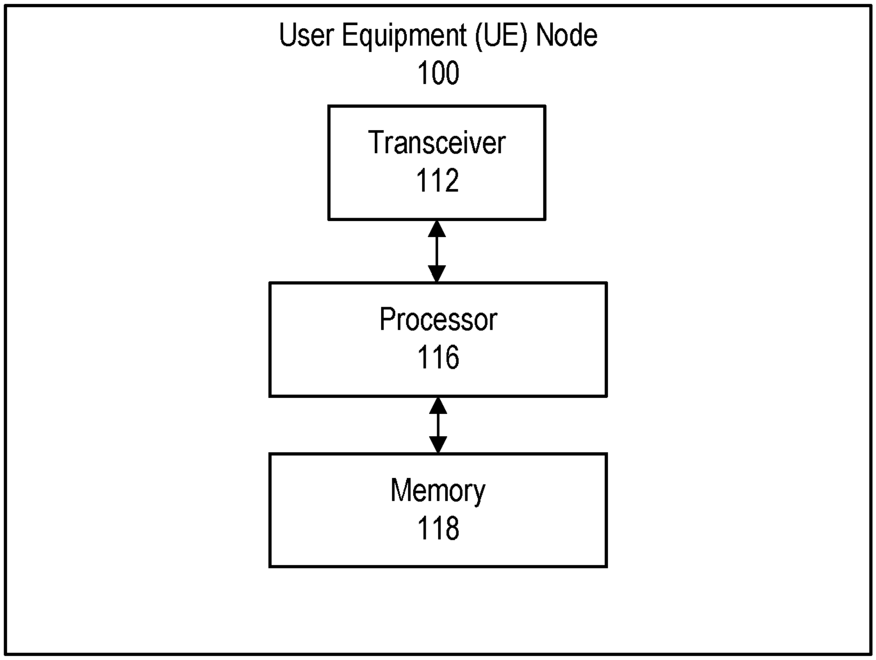
FIG. 12A is a block diagram illustrating an example of a user equipment (UE) node according to some embodiments.

FIG. 12A depicts an example of a UE 100 of a wireless communication network configured to provide wireless communication according to embodiments of inventive concepts. As shown, the UE 100 may include a transceiver circuit 112 (also referred to as a transceiver) including a transmitter and a receiver configured to provide uplink and downlink radio communications with wireless devices. The UE 100 may also include a processor circuit 116 (also referred to as a processor) coupled to the transceiver circuit 112, and a memory circuit 118 (also referred to as memory) coupled to the processor circuit 116. The memory circuit 118 may include computer readable program code that when executed by the processor circuit 116 causes the processor circuit to perform operations according to embodiments disclosed herein. According to other embodiments, processor circuit 116 may be defined to include memory so that a separate memory circuit is not required.

As discussed herein, operations of the UE 100 may be performed by processor 116 and/or transceiver 112. For example, the processor 116 may control transceiver 112 to transmit uplink communications through transceiver 112 over a radio interface to one or more network nodes and/or to receive downlink communications through transceiver 112 from one or more network nodes over a radio interface. Moreover, modules may be stored in memory 118, and these modules may provide instructions so that when instructions of a module are executed by processor 116, processor 116 performs respective operations (e.g., operations discussed above with respect to example embodiments).

Accordingly, a UE 100 according to some embodiments includes a processor circuit 116, a transceiver 112 coupled to the processor circuit, and a memory 118 coupled to the processor circuit, the memory including machine readable program instructions that, when executed by the processor circuit, cause the UE 100 to perform operations described above.

Figure 12B:
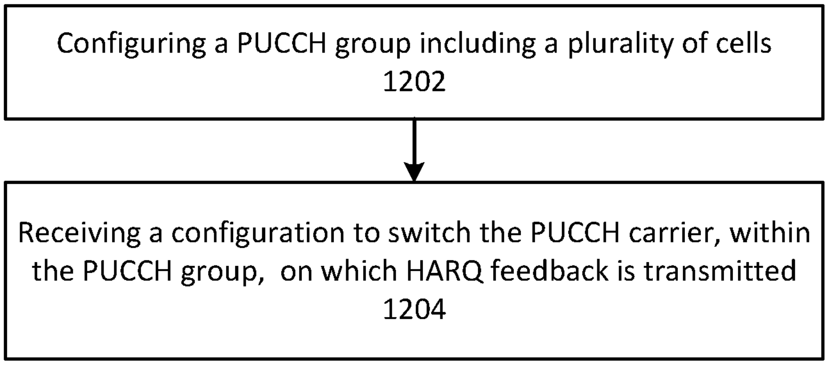
FIG. 12B is a flow chart that illustrates operations of a UE according to some embodiments.

FIG. 12B illustrates operations of a UE according to some embodiments. As shown therein, a method of operating a UE includes configuring (1202) a PUCCH group including a plurality of cells, and receiving (1204) a configuration from a network node to dynamically change a cell on which HARQ feedback for a cell in the PUCCH group is transmitted. Configuring (1202) a PUCCH group may comprise the UE receiving a configuration from the network node that configures the UE with a PUCCH group.

Figure 12C:
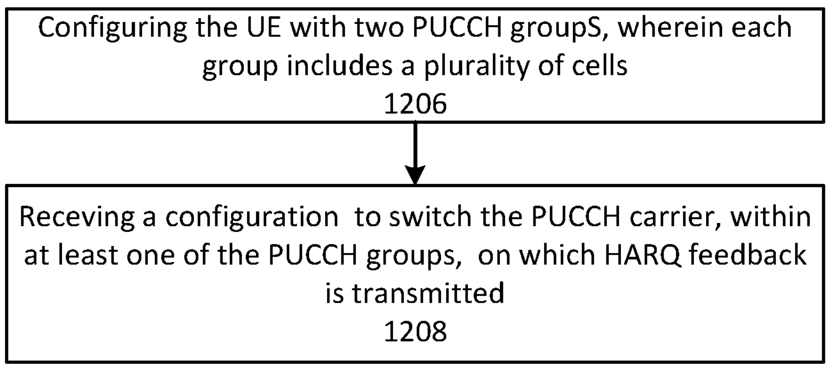

FIG. 12C illustrates operations of a UE according to some embodiments. As shown therein, a method of operating a UE includes configuring (1206) two PUCCH groups, where each PUCCH group comprises a plurality of cells, where the HARQ feedback relating to DL transmissions on the cells in the first PUCCH group is transmitted in the UL of the primary cell, PCell, of the first PUCCH group and the HARQ feedback relating to DL transmissions on the cells in the second PUCCH group is transmitted in the UL of the primary second cell, PSCell, or on a PUCCH secondary cell, PUCCH-SCell, of the second PUCCH group and receiving a configuration (1208), from the network node, to switch the PUCCH carrier, within at least one of the PUCCH groups, on which HARQ the feedback is transmitted.

FIG. 13A is a block diagram of a radio access network (RAN) node according to some embodiments. Various embodiments provide a RAN node that includes a processor circuit 276 and a memory 278 coupled to the processor circuit. The memory 278 includes machine-readable computer program instructions that, when executed by the processor circuit, cause the processor circuit to perform operations depicted in FIG. 13B.

FIG. 13A depicts an example of a RAN node 200 of a wireless communication network configured to provide cellular communication according to embodiments of inventive concepts. The RAN node 200 may include a network interface circuit 274 (also referred to as a network interface) configured to provide communications with other nodes (e.g., with other base stations and/or core network nodes) of the wireless communication network. The memory circuit 278 may include computer readable program code that when executed by the processor circuit 276 causes the processor circuit to perform operations according to embodiments disclosed herein. According to other embodiments, processor circuit 276 may be defined to include memory so that a separate memory circuit is not required. The RAN node 200 includes a transceiver 272 for communicating with UEs 100 in the radio access network.

As discussed herein, operations of the RAN node 200 may be performed by processor 276 and/or network interface 274. For example, the processor 276 may control the network interface 274 to transmit communications through the network interface 274 to one or more other network nodes and/or to receive communications through network interface from one or more other network nodes. Likewise, the processor 276 may control the transceiver 272 to transmit communications through the transceiver 272 to one or more UEs 100 and/or to receive communications through transceiver 272 from one or more UEs 100.

Moreover, modules may be stored in memory 278, and these modules may provide instructions so that when instructions of a module are executed by processor 276, processor 276 performs respective operations. In addition, a structure similar to that of FIG. 13A may be used to implement other network nodes. Moreover, network nodes discussed herein may be implemented as virtual network nodes or as elements of a split-architecture node.

FIG. 13B illustrates operations of a network node according to some embodiments. As shown therein, a method of operating a network node includes configuring (1302) a UE with a PUCCH group including a plurality of cells, and configuring (1304) the UE to dynamically change a cell on which HARQ feedback for a cell of the PUCCH group is transmitted.

FIG. 13C illustrates operations of a network node according to some embodiments. As shown therein, a method of operating a network node includes configuring (1306) the UE with two PUCCH groups, where each PUCCH group comprises a plurality of cells, where the HARQ feedback relating to DL transmissions on the cells in the first PUCCH group is transmitted in the UL of the primary cell, PCell, of the first PUCCH group and the HARQ feedback relating to DL transmissions on the cells in the second PUCCH group is transmitted in the UL of the primary second cell, PSCell, or on a PUCCH secondary cell, PUCCH-SCell, of the second PUCCH group, and configuring (1308) the UE to switch the PUCCH carrier, within at least one of the PUCCH groups, on which HARQ the feedback is transmitted.

LISTING OF EXAMPLE EMBODIMENTS

Example Embodiments are discussed below. Reference numbers/letters are provided in parenthesis by way of example/illustration without limiting example embodiments to particular elements indicated by reference numbers/letters.

Network Node Embodiments

Configuration of Dynamic PUCCH Carrier Switching Operation

Embodiment 1. A method of operating a radio access node, comprising:

configuring (1302) a UE with a PUCCH group including a plurality of cells; and configuring (1304) the UE to dynamically change a cell on which HARQ feedback for a cell of the PUCCH group is transmitted.

Embodiment 2. The method of Embodiment 1, further comprising:

configuring the UE to transmit HARQ feedback on a first cell of the PUCCH group; and dynamically configuring the UE to transmit HARQ feedback on a second cell.

Embodiment 3. The method of Embodiment 2, wherein the second cell is in the PUCCH group.

Embodiment 4. The method of Embodiment 2, wherein the second cell is not in the PUCCH group.

Embodiment 5. The method of any previous Embodiment, wherein the UE is configured to dynamically change the cell on which HARQ feedback is transmitted via an RRC parameter to enable dynamic PUCCH carrier switching.

Embodiment 6. The method of Embodiment 5, wherein the RRC parameter to enable dynamic PUCCH carrier switching is applied to a HARQ-ACK codebook with a certain index/priority.

Embodiment 7. The method of Embodiment 1, wherein the UE is configured to dynamically change the cell on which HARQ feedback is transmitted by implicit signalling.

PUCCH Resource Configurations for Dynamic PUCCH Carrier Switching

Embodiment 8. The method of any previous Embodiment, wherein the UE is configured with a separate PUCCH configuration defining the cell on which HARQ is to be transmitted for a plurality of cells of the PUCCH group.

Embodiment 9. The method of any previous Embodiment, wherein the UE is configured with a single PUCCH configuration defining the cell on which HARQ is to be transmitted that is applied to a plurality of cells of the PUCCH group.

Embodiment 10. The method of Embodiment 9, wherein the PUCCH configuration is applied to cells in multiple PUCCH groups.

Configuration of Applicable UL Cells for HARQ-ACK Feedback with Dynamic PUCCH Carrier Switching Embodiment 11. The method of any previous Embodiment, wherein a first cell of the PUCCH group is an uplink cell that is configured with a set of downlink cells of the PUCCH group which can have a corresponding HARQ-ACK feedback message sent on the first cell.

Embodiment 12. The method of any previous Embodiment, wherein a first cell of the PUCCH group is a downlink cell that is configured with a set of uplink cells of the PUCCH group which can be used to carry a corresponding HARQ-ACK feedback message for messages received on the first cell.

Embodiment 13. The method of any previous Embodiment, wherein a set of applicable UL cells is configured in the UE that can be used to carry HARQ-ACK feedback corresponding to DL transmission in any DL cell.

Type-1 HARQ-ACK Codebook Construction for Dynamic PUCCH Carrier Switching

Embodiment 14. The method of any previous Embodiment, wherein, for a set of slot timing values $K_1$ and a set of applicable DL cells, $$S_{UL,CC\#i}^{DL},$$

the network node configures the UE to determine a set of MA,c occasions for candidate PDSCH receptions for which the UE can transmit corresponding HARQ-ACK information in a PUCCH in slot $n_U$.

Embodiment 15. The method of Embodiment 14, wherein the network node configures the UE to determine a set of MA,c occasions for candidate PDSCH receptions for which the UE can transmit corresponding HARQ-ACK information by independent pruning of TDRA entries for each DL cell.

Embodiment 16. The method of Embodiment 15, wherein the network node configures the UE to determine a set of MA,c occasions for candidate PDSCH receptions for which the UE can transmit corresponding HARQ-ACK information according the following procedure:

For each $K_1$ (starting in descending order of the slot timing values $K_1$ in the set of $K_1$ For each DL cell in $$S_{UL,CC\#i}^{DL}$$

(starting in an ascending order of the cell indices in set $$S_{UL,CC\#i}^{DL}):$$

Prune out the entries in the TDRA table associated with the active BWP of the DL cell which result in PDSCH time resource having at least one symbol configured as an UL symbol. Here the PDSCH time resource is considered for the slot $n_U$–$K_1$, taking into account the slot timing $K_1$.

Further determine the number of non-overlapping PDSCH reception candidates within a slot from the remaining entries in the TDRA table, starting from the first TDRA index.

End for DL cell

End for $K_1$

Embodiment 17. The method of Embodiment 14, wherein the network node configures the UE to determine a set of MA,c occasions for candidate PDSCH receptions for which the UE can transmit corresponding HARQ-ACK information by joint pruning of TDRA entries for each DL cell.

Embodiment 18. The method of Embodiment 17, wherein the network node configures the UE to determine a set of MA,c occasions for candidate PDSCH receptions for which the UE can transmit corresponding HARQ-ACK information according the following procedure:

For each $K_1$ (starting in descending order of the slot timing values, in set $K_1$ For each DL cell in $$S_{UL,CC\#i}^{DL}$$

(starting in an ascending order of the cell indices in set $$S_{UL,CC\#i}^{DL}$$

Prune out the entries in the TDRA table associated with the active BWP of the DL cell which result in PDSCH time resource having at least one symbol configured as an UL symbol. Here the PDSCH time resource is considered for the slot $n_U$–$K_1$, taking into account the slot timing $K_1$.

End for DL cell

Consider a union of all remaining TDRA entries after above step from the TDRA tables associated with DL cells in $$S_{UUL,CC\#i}^{DL}.$$

Determine the number of non-overlapping PDSCH reception candidates within a slot from the union of TDRA entries, starting from the first TDRA index of the lowest DL cell index.

End for

Indication in the DCI to Trigger HARQ-ACK Feedback on Another UL Cell

Embodiment 19. The method of any previous Embodiment, wherein configuring the UE to dynamically change a cell of the PUCCH group on which HARQ feedback is transmitted is performed by providing an indication in a PUCCH resource indicator field.

Embodiment 20. The method of any previous Embodiment, wherein configuring the UE to dynamically change a cell of the PUCCH group on which HARQ feedback is transmitted is performed by providing a separate DCI field that indicates applicable UL cells to use for HARQ-ACK transmission.

Embodiment 21. The method of any previous Embodiment, wherein configuring the UE to dynamically change a cell of the PUCCH group on which HARQ feedback is transmitted is performed by providing two possible PUCCH cell indices to the UE.

Timing Restriction

Embodiment 22. The method of any previous Embodiment, wherein a timing constraint is imposed on the UE processing time when it operates with dynamic PUCCH carrier switching.

Embodiment 23. The method of Embodiment 22, wherein an extra time offset, Δ, is added to $T_{proc,1}$ when the UE is configured to operate with dynamic PUCCH carrier switching.

Embodiment 24. The method of Embodiment 23, wherein the extra time offset is dependent on subcarrier spacing.

Embodiment 25. The method of Embodiment 23, wherein the extra time offset is dependent on a processing time capability of the UE.

UE Feature Restriction

Embodiment 26. The method of any previous Embodiment, wherein dynamic PUCCH carrier indication is restricted to only indicating an UL cell in the same PUCCH groups as the DL cell of the corresponding DL transmission.

Embodiment 27. The method of any previous Embodiment, wherein dynamic PUCCH carrier indication is restricted to only indicating an UL cell with smallest or largest SCS in the same PUCCH group.

Embodiment 28. The method of any previous Embodiment, wherein dynamic PUCCH carrier indication is restricted to be used with configured/defined priority indicator (or codebook index) in a way that dynamic PUCCH carrier indication is allowed only for one CB index/priority and is not allowed for another CB index/priority.

Embodiment 29. The method of any previous Embodiment, wherein the UE is configured with a maximum number of total applicable UL cells to use for HARQ-ACK feedback on PUCCH.

Slot and Sub-Slot PUCCH

Embodiment 30. The method of any previous Embodiment, wherein a plurality of HARQ-ACK codebooks are configured at the UE, and wherein the dynamic PUCCH carrier is configured to only one CB or to both CBs of the plurality of CBs.

Embodiment 31. The method of Embodiment 30, wherein the network node configures the UE to apply carrier switching for HARQ-ACK CB(s) of only a certain index/priority.

MAC CE for Activating/Deactivating Dynamic PUCCH Carrier Switching

Embodiment 32. The method of any previous Embodiment, wherein the network node uses a MAC CE to activate dynamic carrier switching.

Embodiment 33. The method of Embodiment 32, wherein the MAC CE includes a Serving Cell ID that indicates the identity of the PDSCH serving cell for which the MAC CE applies and a PUCCH Cell Indicator that indicates the UL serving cell where the HARQ-ACK for the PDSCH on the Serving Cell are carried.

Semi-Static PUCCH Carrier Switching

Embodiment 34. The method of any previous Embodiment, wherein configuration of the UE to perform dynamic carrier switching is semi-static Embodiment 35. A network node (200), comprising:

a processor circuit (276);

a transceiver (272) coupled to the processor circuit; and a memory (278) coupled to the processor circuit, the memory comprising machine readable program instructions that, when executed by the processor circuit, cause the network node to perform operations comprising:

configuring a UE with a PUCCH group including a plurality of cells; and configuring the UE to dynamically change a cell of the PUCCH group on which HARQ feedback is transmitted.

Embodiment 36. The network node of Embodiment 35, wherein the network node is configured to perform operations according to any of Embodiments 2 to 34.

Embodiment 37. A network node (200) that is configured to perform operations comprising:

configuring a UE with a PUCCH group including a plurality of cells; and configuring the UE to dynamically change a cell of the PUCCH group on which HARQ feedback is transmitted.

Embodiment 38. The network node of Embodiment 37, further configured to perform operations according to any of Embodiments 2 to 34.

Embodiment 39. A computer program comprising instructions for performing operations according to any of Embodiments 1 to 34.

Embodiment 40. A computer program comprising:

a non-transitory computer readable storage medium having computer readable program code embodied in the medium, the computer readable program code comprising computer readable program code configured to perform operations according to any of embodiments 1 to 34.

UE Embodiments

Configuration of Dynamic PUCCH Carrier Switching Operation

Embodiment 41. A method of operating a UE, comprising:

configuring (1202) a PUCCH group including a plurality of cells; and receiving (1204) a configuration from a network node to dynamically change a cell on which HARQ feedback for a cell in the PUCCH group is transmitted.

Embodiment 42. The method of Embodiment 41, further comprising:

transmitting HARQ feedback on a first cell of the PUCCH group;

dynamically reconfiguring transmission of HARQ feedback to a second cell; and transmitting HARQ feedback on the second cell.

Embodiment 43. The method of Embodiment 42, wherein the second cell is in the PUCCH group.

Embodiment 44. The method of Embodiment 42, wherein the second cell is not in the PUCCH group.

Embodiment 45. The method of any previous Embodiment, wherein the UE is configured to dynamically change the cell on which HARQ feedback is transmitted via an RRC parameter to enable dynamic PUCCH carrier switching.

Embodiment 46. The method of Embodiment 45, wherein the RRC parameter to enable dynamic PUCCH carrier switching is applied to a HARQ-ACK codebook with a certain index/priority.

Embodiment 47. The method of Embodiment 41, wherein the UE is configured to dynamically change the cell on which HARQ feedback is transmitted by implicit signalling.

PUCCH Resource Configurations for Dynamic PUCCH Carrier Switching

Embodiment 48. The method of any previous Embodiment, wherein the UE is configured with a separate PUCCH configuration defining the cell on which HARQ is to be transmitted for a plurality of cells of the PUCCH group.

Embodiment 49. The method of any previous Embodiment, wherein the UE is configured with a single PUCCH configuration defining the cell on which HARQ is to be transmitted that is applied to a plurality of cells of the PUCCH group.

Embodiment 50. The method of Embodiment 49, wherein the PUCCH configuration is applied to cells in multiple PUCCH groups.

Configuration of Applicable UL Cells for HARQ-ACK Feedback with Dynamic PUCCH Carrier Switching Embodiment 51. The method of any previous Embodiment, wherein a first cell of the PUCCH group is an uplink cell that is configured with a set of downlink cells of the PUCCH group which can have a corresponding HARQ-ACK feedback message sent on the first cell.

Embodiment 52. The method of any previous Embodiment, wherein a first cell of the PUCCH group is a downlink cell that is configured with a set of uplink cells of the PUCCH group which can be used to carry a corresponding HARQ-ACK feedback message for messages received on the first cell.

Embodiment 53. The method of any previous Embodiment, wherein a set of applicable UL cells is configured in the UE that can be used to carry HARQ-ACK feedback corresponding to DL transmission in any DL cell.

Type-1 HARQ-ACK Codebook Construction for Dynamic PUCCH Carrier Switching

Embodiment 54. The method of any previous Embodiment, wherein, for a set of slot timing values $K_1$ and a set of applicable DL cells, $$S_{UL,CC\#i}^{DL},$$

the network node configures the UE to determine a set of MA,c occasions for candidate PDSCH receptions for which the UE can transmit corresponding HARQ-ACK information in a PUCCH in slot $n_U$.

Embodiment 55. The method of Embodiment 54, wherein the network node configures the UE to determine a set of MA,c occasions for candidate PDSCH receptions for which the UE can transmit corresponding HARQ-ACK information by independent pruning of TDRA entries for each DL cell.

Embodiment 56. The method of Embodiment 55, wherein the UE is configured to determine a set of MA,c occasions for candidate PDSCH receptions for which the UE can transmit corresponding HARQ-ACK information according the following procedure:

For each $K_1$ (starting in descending order of the slot timing values $K_1$ in the set of $K_1$ For each DL cell in $$S_{UL,CC\#i}^{DL}$$

(starting in an ascending order of the cell indices in set $$S_{UL,CC\#i}^{DL}):$$

Prune out the entries in the TDRA table associated with the active BWP of the DL cell which result in PDSCH time resource having at least one symbol configured as an UL symbol. Here the PDSCH time resource is considered for the slot $n_U-K_1$, taking into account the slot timing $K_1$.

Further determine the number of non-overlapping PDSCH reception candidates within a slot from the remaining entries in the TDRA table, starting from the first TDRA index.

End for DL cell

End for $K_1$

Embodiment 57. The method of Embodiment 54, wherein the UE is configured to determine a set of MA,c occasions for candidate PDSCH receptions for which the UE can transmit corresponding HARQ-ACK information by joint pruning of TDRA entries for each DL cell.

Embodiment 58. The method of Embodiment 57, wherein the UE is configured to determine a set of MA,c occasions for candidate PDSCH receptions for which the UE can transmit corresponding HARQ-ACK information according the following procedure:

For each $K_1$ (starting in descending order of the slot timing values, in set $K_1$ For each DL cell in $$S_{UL,CC\#i}^{DL}$$

(starting in an ascending order of the cell indices in set $$S_{UL,CC\#i}^{DL}$$

Prune out the entries in the TDRA table associated with the active BWP of the DL cell which result in PDSCH time resource having at least one symbol configured as an UL symbol. Here the PDSCH time resource is considered for the slot $n_U-K_1$, taking into account the slot timing $K_1$.

End for DL cell

Consider a union of all remaining TDRA entries after above step from the TDRA tables associated with DL cells in $$S^{DL}_{UL,CC\#i}.$$

Determine the number of non-overlapping PDSCH reception candidates within a slot from the union of TDRA entries, starting from the first TDRA index of the lowest DL cell index.

End for $K_1$

Indication in the DCI to Trigger HARQ-ACK Feedback on Another UL Cell

Embodiment 59. The method of any previous Embodiment, wherein the UE is configured to dynamically change a cell of the PUCCH group on which HARQ feedback is transmitted is performed based on an indication in a PUCCH resource indicator field.

Embodiment 60. The method of any previous Embodiment, wherein the UE is configured to dynamically change a cell of the PUCCH group on which HARQ feedback is transmitted based on a separate DCI field that indicates applicable UL cells to use for HARQ-ACK transmission.

Embodiment 61. The method of any previous Embodiment, wherein the UE is configured to dynamically change a cell of the PUCCH group on which HARQ feedback is transmitted based on two possible PUCCH cell indices received by the UE.

Timing Restriction

Embodiment 62. The method of any previous Embodiment, wherein a timing constraint is imposed on the UE processing time when it operates with dynamic PUCCH carrier switching.

Embodiment 63. The method of Embodiment 62, wherein an extra time offset, Δ, is added to $T_{proc,1}$ when the UE is configured to operate with dynamic PUCCH carrier switching.

Embodiment 64. The method of Embodiment 63, wherein the extra time offset is dependent on subcarrier spacing.

Embodiment 65. The method of Embodiment 63, wherein the extra time offset is dependent on a processing time capability of the UE.

UE Feature Restriction

Embodiment 66. The method of any previous Embodiment, wherein dynamic PUCCH carrier indication is restricted to only indicating an UL cell in the same PUCCH groups as the DL cell of the corresponding DL transmission.

Embodiment 67. The method of any previous Embodiment, wherein dynamic PUCCH carrier indication is restricted to only indicating an UL cell with smallest or largest SCS in the same PUCCH group.

Embodiment 68. The method of any previous Embodiment, wherein dynamic PUCCH carrier indication is restricted to be used with configured/defined priority indicator (or codebook index) in a way that dynamic PUCCH carrier indication is allowed only for one CB index/priority and is not allowed for another CB index/priority.

Embodiment 69. The method of any previous Embodiment, wherein the UE is configured with a maximum number of total applicable UL cells to use for HARQ-ACK feedback on PUCCH.

Slot and Sub-Slot PUCCH

Embodiment 70. The method of any previous Embodiment, wherein a plurality of HARQ-ACK codebooks are configured at the UE, and wherein the dynamic PUCCH carrier is configured to only one CB or to both CBs of the plurality of CBs.

Embodiment 71. The method of Embodiment 70, wherein the UE is configured to apply carrier switching for HARQ-ACK CB(s) of only a certain index/priority.

MAC CE for Activating/Deactivating Dynamic PUCCH Carrier Switching

Embodiment 72. The method of any previous Embodiment, wherein the UE activates dynamic carrier switching in response to a MAC CE.

Embodiment 73. The method of Embodiment 72, wherein the MAC CE includes a Serving Cell ID that indicates the identity of the PDSCH serving cell for which the MAC CE applies and a PUCCH Cell Indicator that indicates the UL serving cell where the HARQ-ACK for the PDSCH on the Serving Cell are carried.

Semi-Static PUCCH Carrier Switching

Embodiment 74. The method of any previous Embodiment, wherein configuration of the UE to perform dynamic carrier switching is semi-static Embodiment 75. A user equipment (100), comprising:

a processor circuit (116);

a transceiver (112) coupled to the processor circuit; and a memory (118) coupled to the processor circuit, the memory comprising machine readable program instructions that, when executed by the processor circuit, cause the user equipment to perform operations according to any of Embodiments 41 to 74.

Embodiment 76. A user equipment (100) that is configured to perform operations according to any of Embodiments 41 to 74.

Embodiment 77. A computer program comprising instructions for performing operations according to any of Embodiments 41 to 74.

Embodiment 78. A computer program comprising:

a non-transitory computer readable storage medium having computer readable program code embodied in the medium, the computer readable program code comprising computer readable program code configured to perform operations according to any of embodiments 41 to 74.

Explanations for abbreviations from the above disclosure are provided below.

| Abbreviation | Explanation |
|---|---|
| 3GPP | 3rd Generation Partnership Project |
| 5G | 5th Generation |
| 5GC | 5G Core Network |
| ACK | Acknowledgement |
| AN | Access Network |
| CB | Codebook |
| CBG | Code Block Group |
| CC | Component Carrier |
| CCE | Control Channel Element |
| CE | Control Element |
| CN | Core Network |
| CSI | Channel State Information |
| DCI | Downlink Control Information |
| DL | Downlink |
| eMBB | Enhanced Mobile Broadband |
| eNB | Evolved NodeB (a radio base station in LTE) |
| FDM | Frequency Division Multiplexing |
| gNB | A radio base station in NR. |
| HARQ-ACK | Hybrid automatic repeat request Acknowledgement |
| LTE | Long Term Evolution |

-continued

| Abbreviation | Explanation |
|---|---|
| MAC | Medium Access Control |
| NACK | Negative Acknowledgement |
| NG-RAN | Next Generation Radio Access Network |
| OFDM | Orthogonal Frequency Division Multiplexing |
| PDCCH | Physical Downlink Control Channel |
| PDSCH | Physical Downlink Shared Channel |
| PRI | PUCCH Resource Indicator |
| PUCCH | Physical Uplink Control Channel |
| PUSCH | Physical Uplink Shared Channel |
| RAN | Radio Access Network |
| RNTI | Radio Network Temporary Identifier |
| RRC | Radio Resource Control |
| SCS | Subcarrier Spacing |
| SDM | Space Division Multiplexing |
| SPS | Semi-persistent Scheduling |
| SR | Scheduling Request |
| TB | Transport Block |
| TDM | Time Division Multiplexing |
| TDRA | Time Domain Resource Assignment |
| TRP | Transmission Reception Point |
| UE | User Equipment |
| UCI | Uplink control information |
| UL | Uplink |
| URLLC | Ultra-Reliable and Low Latency Communication |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 14: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ192 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ112 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

FIG. 15: User Equipment in accordance with some embodiments

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 15, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ213, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. 16: Virtualization environment in accordance with some embodiments

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 16, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

FIG. 17: Telecommunication network connected via an intermediate network to a host computer in accordance with some embodiments.

With reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

FIG. 18: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 18. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520. Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 18 may be similar or identical to host computer QQ430, one of base stations QQ412*a*, QQ412*b*, QQ412*c* and one of UEs QQ491, QQ492 of FIG. 17, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 20: Methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. 21: Methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 22: Methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a UE, comprising:

configuring two physical uplink control channel, PUCCH, groups, wherein each PUCCH group comprises a plurality of cells, wherein a Hybrid-Automatic Repeat ReQuest acknowledgement, HARQ-ACK, feedback relating to downlink, DL, transmissions on the cells in the first PUCCH group is transmitted in an uplink, UL, of the primary cell, PCell, of the first PUCCH group and the HARQ-ACK feedback relating to DL transmissions on the cells in the second PUCCH group is transmitted in the UL of the primary second cell, PSCell, or on a PUCCH secondary cell, PUCCH-SCell, of the second PUCCH group; and receiving a configuration to switch the PUCCH carrier, within at least one of the PUCCH groups, on which the HARQ-ACK feedback is transmitted, wherein the UE is configured to dynamically switch the PUCCH carrier on which HARQ-ACK feedback is transmitted via a radio resource control, RRC, parameter to enable dynamic PUCCH carrier switching.

2. The method of claim 1, wherein the RRC parameter to enable dynamic PUCCH carrier switching is applied to a HARQ-ACK codebook with a certain index/priority.

3. The method of claim 1, wherein, if UE is configured with PUCCH resource configuration for more than one carrier in a PUCCH group, the UE is implicitly configured to dynamically switch the carrier on which HARQ-ACK feedback is transmitted.

4. The method of claim 1, wherein the UE is configured with a separate PUCCH configuration defining the UL cell on which HARQ-ACK is to be transmitted for a plurality of cells of the PUCCH group.

5. The method of claim 1, wherein the UE is configured with a single PUCCH configuration defining the UL cell on which HARQ-ACK is to be transmitted that is applied to a plurality of UL cells of the PUCCH group.

6. The method of claim 5, wherein the PUCCH configuration is applied to UL cells in multiple PUCCH groups.

7. The method of claim 1, wherein a first cell of the PUCCH group is an uplink cell that is configured with a set of downlink cells of the PUCCH group which can have a corresponding HARQ-ACK feedback message sent on the first cell.

8. The method of claim 1, wherein a first cell of the PUCCH group is a downlink cell that is configured with a set of uplink cells of the PUCCH group which can be used to carry a corresponding HARQ-ACK feedback message for messages received on the first cell.

9. The method of claim 1, wherein a set of applicable UL cells in the PUCCH group is configured in the UE that can be used to carry HARQ-ACK feedback corresponding to DL transmission in any DL cell in the PUCCH group.

10. The method of claim 1, wherein the carrier in the PUCCH group on which HARQ-ACK feedback is transmitted is performed based on an indication in a PUCCH resource indicator field in a downlink control information, DCI.

11. The method of claim 10, wherein serving cell ID which identifies the UL cell on which HARQ-ACK feedback is transmitted is comprised in the PUCCH resource configuration of a Radio Resource Configuration message used to configure the UE to switch the PUCCH carrier on which the HARQ-ACK feedback is transmitted.

12. The method of claim 1, wherein a DCI field is used to select the UL cell to use for HARQ-ACK feedback.

13. The method of claim 1, wherein the PUCCH carrier indication for HARQ-ACK feedback of semi-persistent scheduling, SPS, PDSCH is comprised in the activation DCI of each SPS configuration.

14. The method of claim 13, wherein an extra time offset, A, is added to $T_{proc,1}$ when the UE is configured to operate with dynamic PUCCH carrier switching.

15. The method of claim 1, wherein the UE is configured to switch the PUCCH carrier on which HARQ-ACK feedback is transmitted based on two possible PUCCH cell indices received by the UE where the 1-bit field in a DCI scheduling PDSCH is used to indicate the PUCCH cell/carrier.

16. The method of claim 15, wherein the extra time offset is dependent on subcarrier spacing.

17. The method of claim 15, wherein the extra time offset is dependent on a processing time capability of the UE.

18. The method of claim 1, wherein a timing constraint is imposed on a UE processing time when it operates with dynamic PUCCH carrier switching.

* * * * *